United States Patent
Yamada et al.

(10) Patent No.: US 10,748,014 B2
(45) Date of Patent: Aug. 18, 2020

(54) PROCESSING DEVICE, OBJECT RECOGNITION APPARATUS, DEVICE CONTROL SYSTEM, PROCESSING METHOD, AND COMPUTER-READABLE RECORDING MEDIUM

(71) Applicant: Ricoh Company, Ltd., Tokyo (JP)

(72) Inventors: Yuu Yamada, Kanagawa (JP); Soichiro Yokota, Kanagawa (JP); Sadao Takahashi, Kanagawa (JP); Shinichi Sumiyoshi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 151 days.

(21) Appl. No.: 16/018,173

(22) Filed: Jun. 26, 2018

(65) Prior Publication Data

US 2018/0300562 A1 Oct. 18, 2018

Related U.S. Application Data

(63) Continuation of application No. PCT/JP2016/088559, filed on Dec. 22, 2016.

(30) Foreign Application Priority Data

Dec. 28, 2015 (JP) .................... 2015-256751
Mar. 18, 2016 (JP) .................... 2016-056277

(51) Int. Cl.
*G06K 9/00* (2006.01)
*G06T 7/00* (2017.01)
(Continued)

(52) U.S. Cl.
CPC ..... *G06K 9/00805* (2013.01); *G06K 9/00671* (2013.01); *G06K 9/00825* (2013.01);
(Continued)

(58) Field of Classification Search
None
See application file for complete search history.

(56) References Cited

U.S. PATENT DOCUMENTS

| 6,487,303 B1 | 11/2002 | Yamaguchi et al. |
| 2007/0076984 A1 | 4/2007 | Takahashi et al. |
| (Continued) | | |

FOREIGN PATENT DOCUMENTS

| EP | 2 743 861 A2 | 6/2014 |
| JP | 06-266828 | 9/1994 |
| (Continued) | | |

OTHER PUBLICATIONS

International Search Report dated Jan. 31, 2017 in PCT/JP2016/088559 filed Dec. 22, 2016(with English translation.
(Continued)

*Primary Examiner* — Delomia L Gilliard
(74) *Attorney, Agent, or Firm* — Xsensus LLP

(57) ABSTRACT

According to an embodiment, a processing device includes a generating unit, a detecting unit, and a determining unit. The generating unit is configured to generate two-dimensional distribution information of an object, the two-dimensional distribution information associating between at least a lateral direction distance and a depth direction distance of the object. The detecting unit is configured to detect a continuous area having continuity in a depth direction in the two-dimensional distribution information. The determining unit is configured to determine whether the continuous area represents a detection target.

20 Claims, 25 Drawing Sheets

(51) Int. Cl.
*G08G 1/16* (2006.01)
*G06T 1/00* (2006.01)
*G06T 7/593* (2017.01)

(52) U.S. Cl.
CPC .................. *G06T 1/00* (2013.01); *G06T 7/00* (2013.01); *G06T 7/596* (2017.01); *G08G 1/16* (2013.01); *G06T 2207/30261* (2013.01)

(56) References Cited

U.S. PATENT DOCUMENTS

| | | | |
|---|---|---|---|
| 2007/0195070 A1 | 8/2007 | Takahashi et al. | |
| 2007/0195370 A1 | 8/2007 | Suga et al. | |
| 2011/0222732 A1 | 9/2011 | Higuchi et al. | |
| 2012/0242835 A1 | 9/2012 | Li et al. | |
| 2013/0057707 A1 | 3/2013 | Hasegawa et al. | |
| 2015/0049195 A1 | 2/2015 | Ishigaki et al. | |
| 2015/0294160 A1 | 10/2015 | Takahashi et al. | |
| 2015/0302560 A1 | 10/2015 | Sumiyoshi | |
| 2015/0332103 A1 | 11/2015 | Yokota et al. | |
| 2015/0334269 A1 | 11/2015 | Yokota et al. | |
| 2016/0014406 A1 | 1/2016 | Takahashi et al. | |
| 2016/0019429 A1 | 1/2016 | Ishigaki et al. | |
| 2016/0253575 A1 | 9/2016 | Kakegawa et al. | |
| 2016/0301912 A1 | 10/2016 | Saitoh et al. | |
| 2018/0276835 A1* | 9/2018 | Amano | G06T 7/564 |
| 2018/0276837 A1* | 9/2018 | Amano | G06T 7/596 |
| 2018/0285661 A1* | 10/2018 | Amano | G01C 3/06 |
| 2018/0336701 A1* | 11/2018 | Yokota | G06T 7/74 |
| 2019/0012798 A1* | 1/2019 | Amano | G08G 1/16 |

FOREIGN PATENT DOCUMENTS

| | | |
|---|---|---|
| JP | 10-143659 | 5/1998 |
| JP | 2009-186301 | 8/2009 |
| JP | 2009186301 A * | 8/2009 |
| JP | 2010-018062 | 1/2010 |
| JP | 5094658 | 9/2012 |
| JP | 2014-081827 | 5/2014 |
| JP | 2014-120167 | 6/2014 |
| JP | 2017-058890 | 3/2017 |
| WO | WO 2015/053100 A1 | 4/2015 |

OTHER PUBLICATIONS

Written Opinion dated Jan. 31, 2017 in PCT/JP2016/088559 filed Dec. 22, 2016.
Extended European Search Report dated Dec. 10, 2018 in corresponding European Patent Application No. 16881707.0, 8 pages.
Alexandru Iloie et al., "UV Disparity Based Obstacle Detection and Pedestrian Classification in Urban Traffic Scenarios", IEEE, XP032671049, Sep. 4, 2014, pp. 119-125.
Zhencheng Hu et al., "U-V-Disparity: An Efficient Algorithm for Stereovision Based Scene Analysis", IEEE, XP010833942, Jun. 6, 2005, pp. 48-54.

* cited by examiner

CAPTURED IMAGE

U-MAP

CAPTURED IMAGE

REAL U-MAP

LABELING HAVING PRIORITY IN DEPTH DIRECTION

EXAMPLE OF LABELING IN U-MAP

CAPTURED IMAGE

U-MAP

CAPTURED IMAGE

U-MAP

LABELING RESULTS

LABELING RESULTS

RESULTS OF SORTING BY USE
OF DIFFERENT REFERENCE
FOR EACH AREA

FIG.18A
FIG.18B
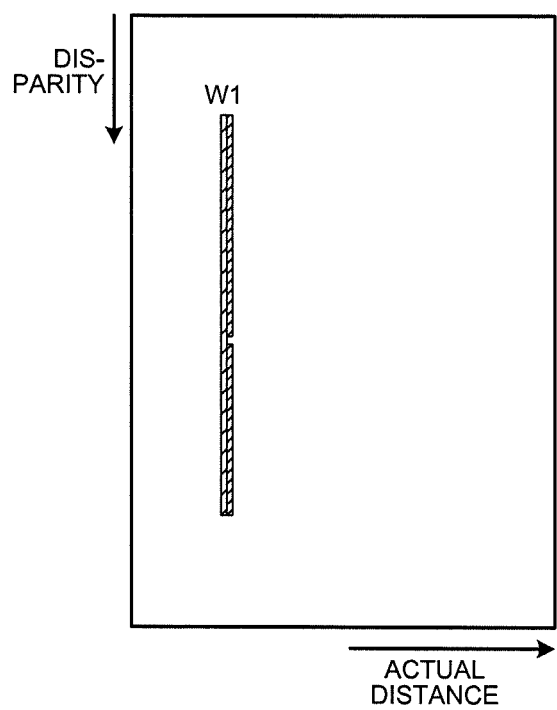
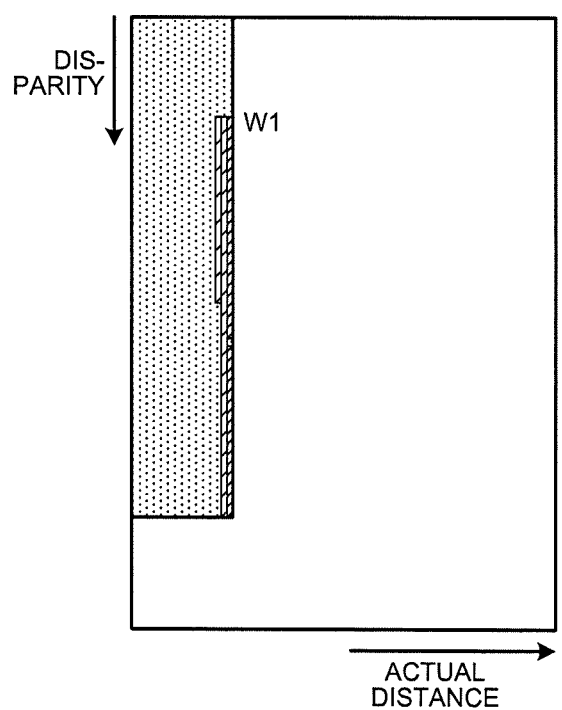
 WALL, AND AREA OUTSIDE WALL

CAPTURED IMAGE

U-MAP

LABELING RESULTS

CAPTURED IMAGE

U-MAP

LABELING RESULTS

CANDIDATE DETECTION RESULTS

INTEGRATION RESULTS

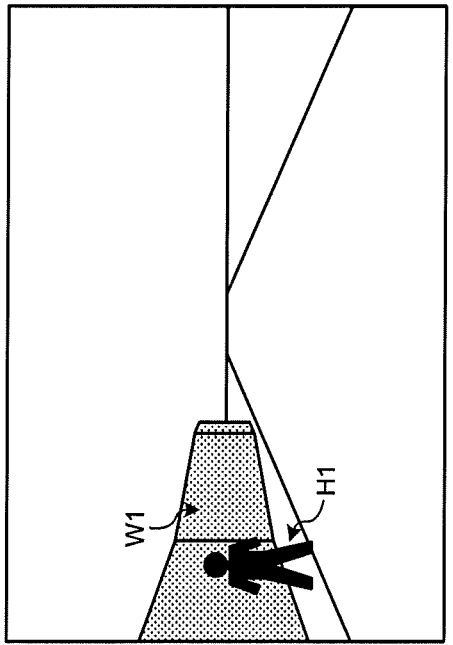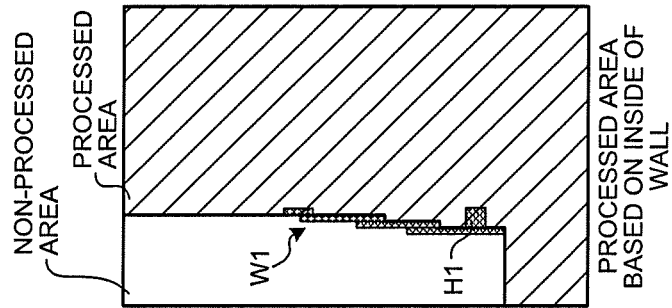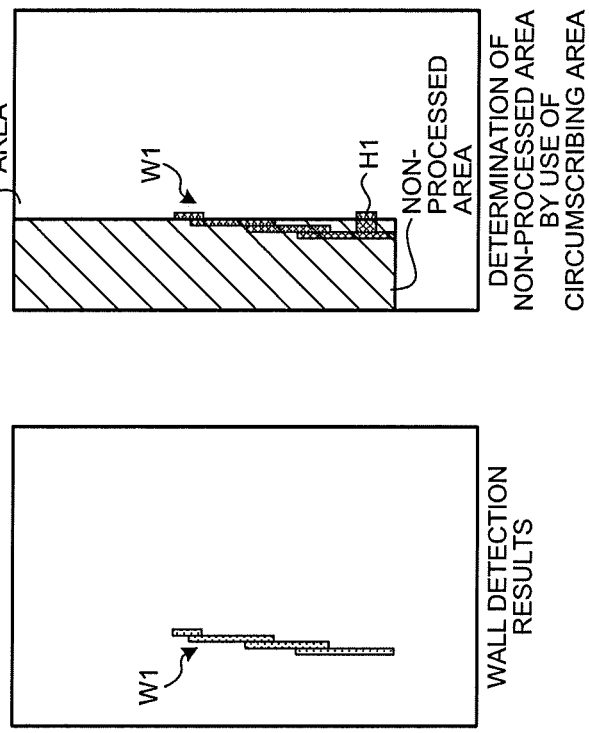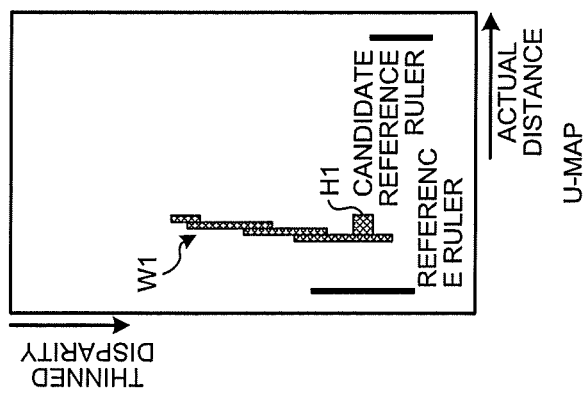

PROCESSING DEVICE, OBJECT RECOGNITION APPARATUS, DEVICE CONTROL SYSTEM, PROCESSING METHOD, AND COMPUTER-READABLE RECORDING MEDIUM

CROSS-REFERENCE TO RELATED APPLICATIONS

This application is a continuation of PCT international application Ser. No. PCT/JP2016/088559 filed on Dec. 22, 2016 which designates the United States, incorporated herein by reference, and which claims the benefit of priority from Japanese Patent Applications No. 2015-256751, filed on Dec. 28, 2015 and Japanese Patent Applications No. 2016-056277, filed on Mar. 18, 2016, incorporated herein by reference.

BACKGROUND OF THE INVENTION

1. Field of the Invention

Embodiments relate to a processing device, an object recognition apparatus, a device control system, a processing method, and a computer-readable recording medium.

2. Description of the Related Art

Conventionally, for safety of automobiles, in terms of how a pedestrian is able to be guarded and passengers are able to be protected upon a collision between the pedestrian and an automobile, body structures and the like of automobiles have been developed. However, in recent years, due to advancement of information processing technology and image processing technology, object recognition technology for avoidance of collisions by high speed detection (recognition) of objects, such as humans and automobiles, by use of disparity, is under development.

Further, disclosed in Japanese Unexamined Patent Application Publication No. H06-266828 is an outside-vehicle monitoring device for vehicles, which detects, based on positional information on targets in a set range outside a vehicle: presence of any side wall that is a continuous three-dimensional object serving as a road boundary, such as a guardrail, a shrubbery, or a row of pylons; a linear equation approximating position of this side wall; and a range where this side wall is present.

However, conventionally, there has been a problem that much calculation is needed for detection of a range, in which a three-dimensional object, such as a side wall, a guard rail, or a shrubbery, on a road is present.

In view of the above, there is a need to provide a processing device, an object recognition apparatus, a device control system, a processing method, and a computer-readable recording medium, which enable a continuous three-dimensional object to be easily detected.

SUMMARY OF THE INVENTION

According to an embodiment, a processing device includes a generating unit, a detecting unit, and a determining unit. The generating unit is configured to generate two-dimensional distribution information of an object, the two-dimensional distribution information associating between at least a lateral direction distance and a depth direction distance of the object. The detecting unit is configured to detect a continuous area having continuity in a depth direction in the two-dimensional distribution information. The determining unit is configured to determine whether the continuous area represents a detection target.

BRIEF DESCRIPTION OF THE DRAWINGS

FIGS. 18A and 18B are diagrams exemplifying results of the processing illustrated in FIG. 17 executed by the area determining unit.

FIGS. 27A, 27B, 27C, 27D, and 27E are diagrams illustrating how object detection is executed by zoning into a wall area and a detection area for other objects, based on results of wall detection.

DESCRIPTION OF THE EMBODIMENTS

Figure 1:
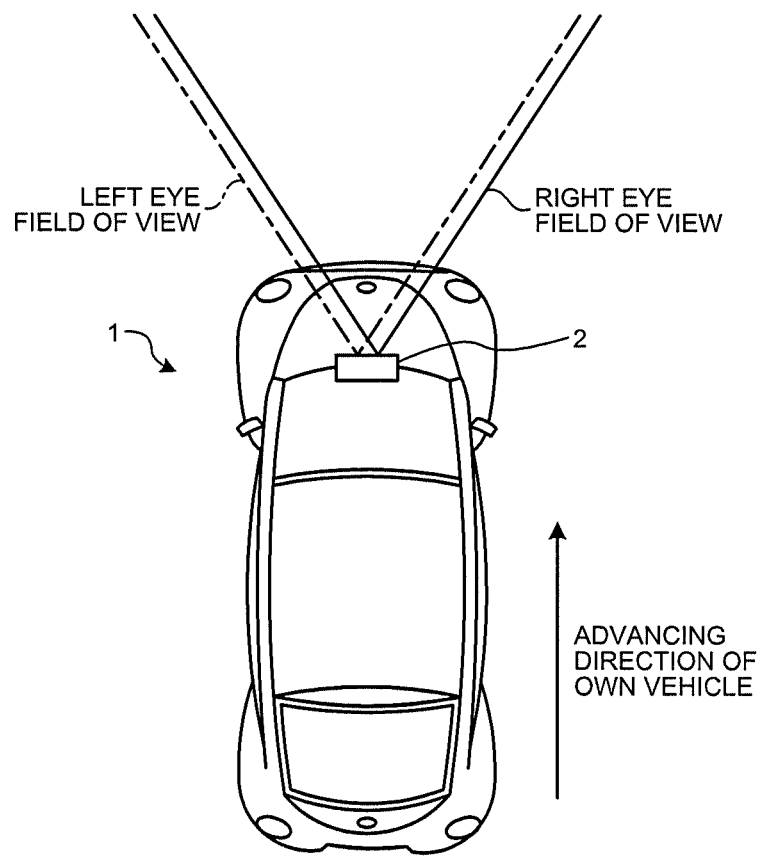
FIG. 1 is a diagram illustrating a position of a stereo camera provided in a vehicle that is a device control system according to a first embodiment of the present invention.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

First Embodiment

Hereinafter, by reference to the appended drawings, a device control system according to an embodiment will be described. FIG. 1 is a diagram illustrating a position of a stereo camera 2 installed in a vehicle 1 that is an example of a device control system according to a first embodiment of the present invention. For example, the vehicle 1 is an automobile having the stereo camera 2, which captures an image of a predetermined imaging range ahead in an advancing direction of the automobile, and which is provided in a front portion of the automobile. The stereo camera 2 is an imaging unit, which includes two image sensors 22 as described later by use of FIG. 3, and which captures two images of a left eye's field of view and a right eye's field of view.

Figure 2:
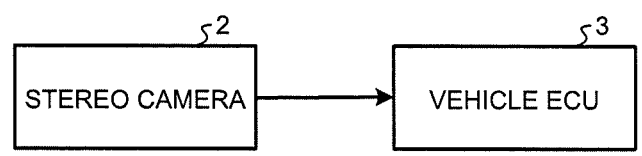
FIG. 2 is a diagram illustrating the stereo camera and a component peripheral to the stereo camera, which the vehicle has.

FIG. 2 is a diagram illustrating the stereo camera 2 and an example of a component peripheral to the stereo camera 2, which the vehicle 1 has. The stereo camera 2 outputs, for example, the two images captured, to a vehicle engine control unit (ECU) 3. The vehicle ECU 3 is installed in the vehicle 1, and comprehensively executes: electric control of an engine of the vehicle 1 and other parts of the vehicle 1; and processing therefor.

Figure 3:
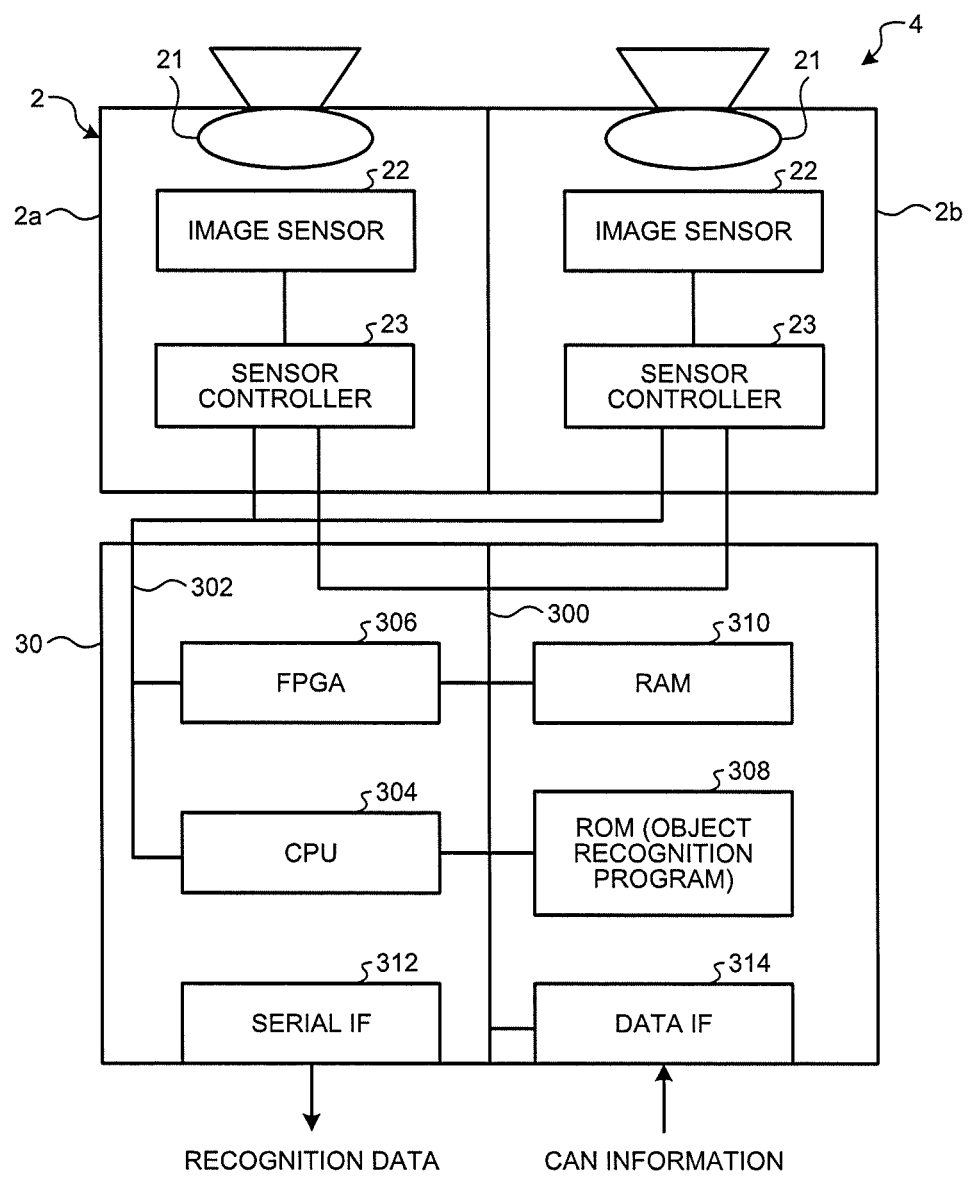
FIG. 3 is a diagram illustrating an example of a configuration of an object recognition apparatus including the stereo camera.

FIG. 3 is a diagram illustrating an example of a configuration of an object recognition apparatus 4 including the stereo camera 2. The object recognition apparatus 4 has, for example, the stereo camera 2 and an image processing device 30. The stereo camera 2 has a camera unit 2a for a left eye, and a camera unit 2b for a right eye, which are assembled therein parallelly (horizontally), and captures a moving image (or a still image) of a region to be captured.

Each of the camera units 2a and 2b includes a lens 21, an image sensor 22, and a sensor controller 23. The image sensor 22 is, for example, a charge coupled device (CCD) image sensor or a complementary metal-oxide semiconductor (CMOS) image sensor. The sensor controller 23 executes, for example, exposure control, image reading control, communication with an external circuit, and image data transmission control, for the image sensor 22.

The image processing device 30 is provided in, for example, the vehicle ECU 3 illustrated in FIG. 2. The image processing device 30 has, for example, a data bus line 300, a serial bus line 302, a central processing unit (CPU) 304, a field-programmable gate array (FPGA) 306, a read only memory (ROM) 308, a random access memory (RAM) 310, a serial interface (IF) 312, and a data interface (IF) 314.

The above described stereo camera 2 is connected to the image processing device 30 via the data bus line 300 and the serial bus line 302. The CPU 304 controls operation of the whole image processing device 30, and executes image processing and image recognition processing. Luminance image data of the captured image captured by the image sensor 22 of each of the camera units 2a and 2b are written into the RAM 310 of the image processing device 30 via the data bus line 300. Change control data for sensor exposure value from the CPU 304 or the FPGA 306, change control data for image reading parameters, various setting data, and the like are transmitted and received via the serial bus line 302.

The FPGA 306 generates a disparity image by executing, for example, gamma correction, skew correction (parallelization of left and right images), and disparity calculation through block matching, which are processing requiring real-timeness, on image data stored in the RAM 310, and rewrites the generated disparity image into the RAM 310. The CPU 304 executes control of each of the sensor controllers 23 of the stereo camera 2, and the overall control of the image processing device 30. Further, the ROM 308 has an object recognition program, which is for execution of situation recognition, prediction, object recognition, and the like, stored therein.

The object recognition program is an example of an image processing program. The CPU 304 obtains, for example, controller area network (CAN) information of its own vehicle, as parameters (such as vehicle speed, acceleration, steering angle, and yaw rate), via the data IF 314. According to the object (three-dimensional object) recognition program stored in the ROM 308, the CPU 304 executes various types of processing, such as situation recognition, by using luminance image data and disparity image data stored in the RAM 310, and executes, for example, detection (recognition) of a detection target, such as a preceding vehicle. Further, rejection processing on image data is also implemented by the CPU 304.

Detection data (recognition data) on the detection target (recognition target) are output, via the serial IF 312, to, for example, an automatic braking system or an automatic speed control system, which has its control functions provided in the vehicle ECU 3. The automatic braking system executes braking control for the vehicle 1 by using the recognition data on the recognition target. Further, the automatic speed control system executes speed control for the vehicle 1 by using the recognition data on the recognition target.

Figure 4:
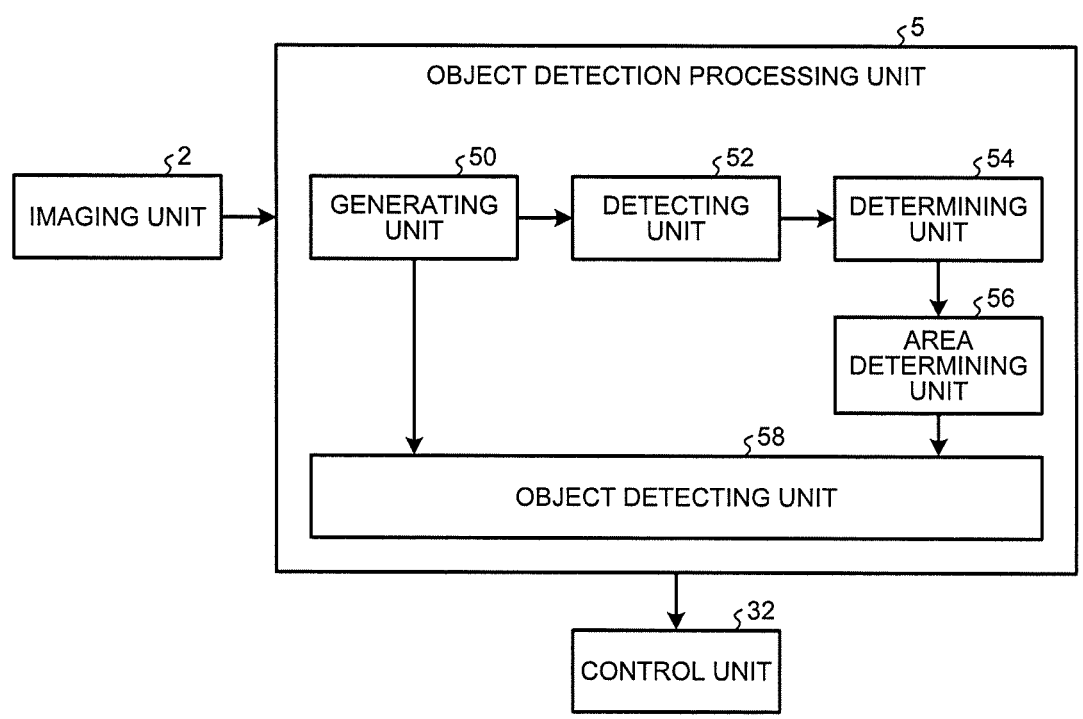
FIG. 4 is a functional block diagram of functions implemented by execution of an object recognition program.
Figure 5:
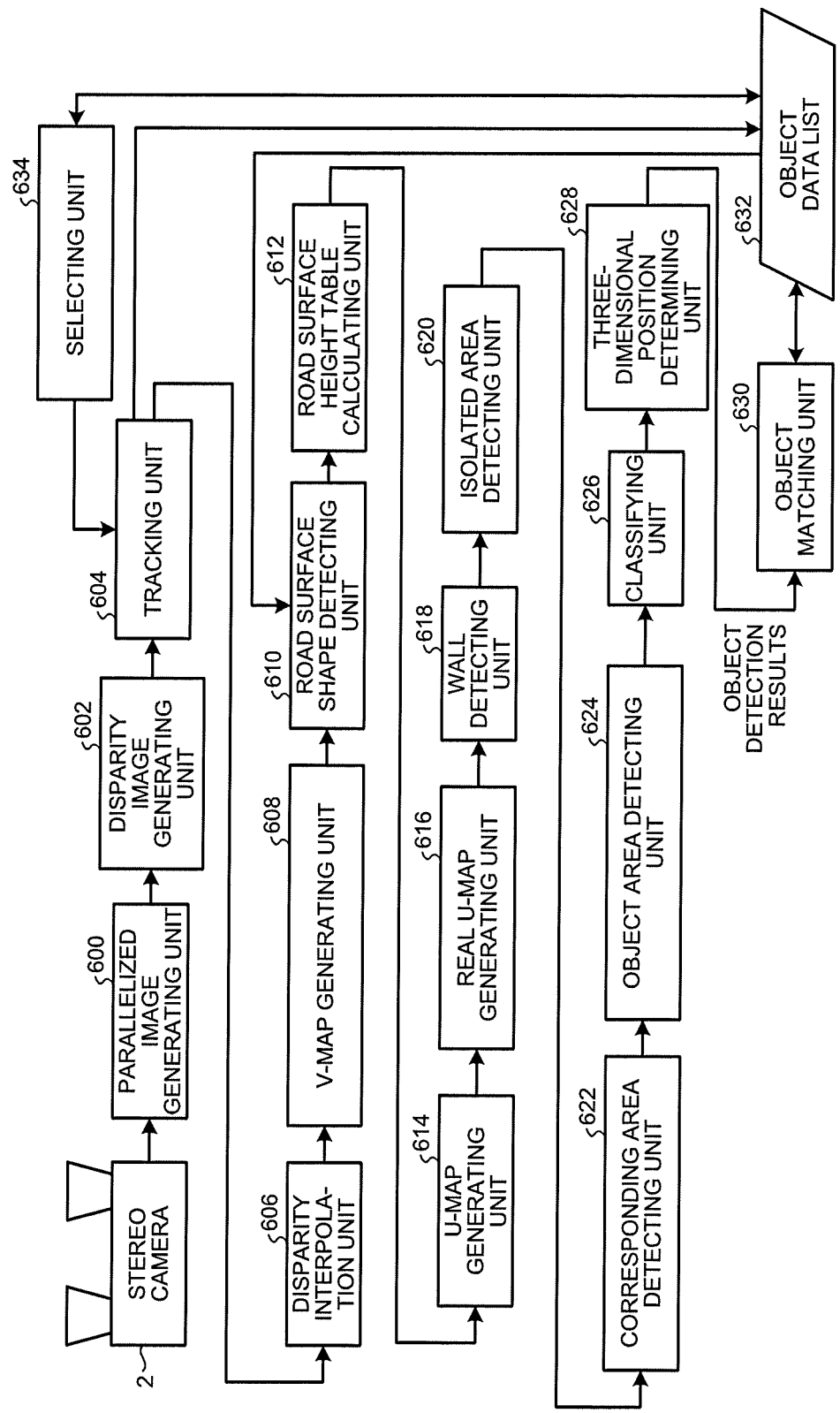
FIG. 5 is a detailed functional block diagram of the functions implemented by the execution of the object recognition program.

Next, device control executed by the vehicle 1 using the stereo camera 2 will be described. FIG. 4 is a functional block diagram of functions implemented by the CPU 304 executing the object recognition program. FIG. 5 is a functional block diagram illustrating the functions illustrated in FIG. 4 in more detail.

Firstly, in FIG. 4, for execution of device control by use of images, the vehicle 1 has the imaging unit (stereo camera) 2, an object detection processing unit 5, and a control unit 32. The control unit 32 is provided in, for example, the vehicle ECU 3, and controls, according to results of processing by the object detection processing unit 5, an engine, brakes, or the like provided in the vehicle 1.

The object detection processing unit 5 corresponds to functions implemented by the CPU 304 executing the object recognition program. The object detection processing unit 5 has a generating unit 50, a detecting unit 52, a determining unit 54, an area determining unit 56, and an object detecting unit 58. The object detection processing unit 5 detects continuous three-dimensional objects, such as side walls, guardrails, and shrubberies, on roads. Further, the object detection processing unit 5 detects a non-continuous three-dimensional object, such as, for example, an automobile or a human. Further, the object detection processing unit 5 is not necessarily formed of software, and a part or all of the object detection processing unit 5 may be formed of hardware.

In FIG. 4, the imaging unit (stereo camera) 2 captures images by using each of the image sensors 22. One of the captured images serves as a reference image, and the other one of the captured images serves as a comparison image (time series stereo images). The comparison image is captured from an imaging position different from that for the reference image.

The generating unit 50 generates a map having pixels represented in an orthogonal coordinate system having, as coordinate axes, values respectively based on actual distance and disparity in a horizontal direction, the pixels representing appearance frequencies of disparity values calculated from the time series stereo images captured by the stereo camera 2.

The detecting unit 52 detects a continuous pixel area having priority in a direction of the axis of the value based on the disparity, on the map generated by the generating unit 50. More specifically, the detecting unit 52 detects, as the continuous pixel area, an area where pixels are continuous in the direction of the axis of the value based on the disparity, on the map generated by the generating unit 50. In other words, the detecting unit 52 detects the continuous pixel area having continuity in a depth direction, by executing labeling processing described later.

The determining unit 54 determines, based on a length of the continuous pixel area in the direction of the axis of the value based on the disparity on the map generated by the generating unit 50, whether or not the continuous pixel area represents a continuous three-dimensional object. More specifically, if the number of continuous pixels in the continuous pixel area is equal to or greater than a predefined reference, the determining unit 54 determines that the continuous pixel area represents a continuous three-dimensional object captured by the stereo camera. That is, if the determining unit 54 determines that the continuous pixel area detected by the detecting unit 52 represents a continuous three-dimensional object, the continuous three-dimensional object is detected.

Based on the continuous pixel area determined by the determining unit 54 to represent a continuous three-dimensional object, the area determining unit 56 determines an object detection target area, in which any object (any non-continuous three-dimensional object) is to be detected in the time series stereo images.

The object detecting unit 58 detects, based on the map generated by the generating unit 50, any object (any non-continuous three-dimensional object) in the time series stereo images. Specifically, the object detecting unit 58 detects any object (any non-continuous three-dimensional object) in the object detection target area determined by the area determining unit 56.

Next, by use of FIG. 5, such functions of the object detection processing unit 5 will be described in detail. The object detection processing unit 5, in detail, has, as illustrated in FIG. 5, a parallelized image generating unit 600, a disparity image generating unit 602, a tracking unit 604, a disparity interpolation unit 606, a V-map generating unit 608, a road surface shape detecting unit 610, a road surface height table calculating unit 612, a U-map generating unit 614, and a real U-map generating unit 616. Further, the object detection processing unit 5 has a wall detecting unit 618, an isolated area detecting unit 620, a corresponding area detecting unit 622, an object area detecting unit 624, a classifying unit 626, a three-dimensional position determining unit 628, an object matching unit 630, and a selecting unit 634.

Among these, the parallelized image generating unit 600, the disparity image generating unit 602, the tracking unit 604, the disparity interpolation unit 606, the V-map generating unit 608, the road surface shape detecting unit 610, the road surface height table calculating unit 612, the U-map generating unit 614, and the real U-map generating unit 616 correspond to the generating unit 50. Further, the wall detecting unit 618 corresponds to the detecting unit 52, the determining unit 54, and the area determining unit 56. Furthermore, the isolated area detecting unit 620, the corresponding area detecting unit 622, the object area detecting unit 624, the classifying unit 626, and the three-dimensional position determining unit 628 correspond to the object detecting unit 58.

In FIG. 5, the stereo camera 2 outputs luminance image data. The parallelized image generating unit 600 executes parallelized image generation processing. The disparity image generating unit 602 executes disparity image generation processing of generating disparity image data (disparity image information).

The disparity interpolation unit 606 executes disparity image interpolation processing. The V-map generating unit 608 generates a V-map, based on each pixel value, for which a voted area has been limited. The road surface shape detecting unit 610 and the road surface height table calculating unit 612 calculate a height of a road surface before generation of a V-map corresponding to a disparity image is completed.

Based on each pixel value and the height of the road surface calculated by the road surface height table calculating unit 612, the U-map generating unit 614 generates a U-map representing a frequency distribution of disparity values in the horizontal direction of the disparity image. Based on the U-map generated by the U-map generating unit 614, the real U-map generating unit 616 generates a small U-map, which is a U-map having a low resolution, for detection of any continuous object, such as a wall. Further, the real U-map generating unit 616 generates a real U-map, which is a U-map having a high resolution, for detection of any non-continuous object, such as a human or an automobile. That is, the real U-map generating unit 616 generates two types of U-maps, the low resolution U-map and the high resolution U-map.

The wall detecting unit 618 detects a portion where pixels are continuous, the pixels each having a disparity value equal to or greater than a predetermined threshold in the depth direction on the small U-map. Further, if a gap in the depth direction is equal to or less than a predetermined number of pixels, wall candidates adjacent to each other via the gap are connected to each other, such that the wall candidates are easily detected as a series of walls. If the continuous portion has a length equal to or greater than a predetermined threshold, that continuous portion is detected as a wall.

By use of the small U-map that is the low resolution U-map, influence of disparity dispersion is able to be suppressed, and an object continuous in the depth direction is able to be detected. Further, by the reduction in resolution, high speed processing is enabled. Furthermore, by use of the small U-map low in resolution, detection of an object that is long in the depth direction is enabled by a technique small in the amount of calculation, such as labeling.

That is, by using the low resolution U-map, the wall detecting unit 618 enables detection by labeling that is image processing, with the influence of disparity dispersion being reduced. Further, since the image size is decreased, speed of the detection is increased. If a wall is detected, the wall and an area outside the wall are determined, and the area outside the wall is not processed in the isolated area detecting unit 620 at a later stage.

The isolated area detecting unit 620 executes smoothing of information of the real U-map generated by the real U-map generating unit 616, and outputs isolated area information. The corresponding area detecting unit 622 for the disparity image determines, based on the isolated area information output from the isolated area detecting unit 620, a range to be detected in the disparity image.

The object area detecting unit 624 searches for an object line in a search area in the disparity image, determines the lower most end and the uppermost end of the object line, and determines an object area in the disparity image. From information on calculated height, width, and depth of an object corresponding to the object area, the classifying unit 626 for object types executes classification of the object into an object type.

The three-dimensional position determining unit 628 determines, based on a distance to the object corresponding to the detected object area, and a distance on the image between an image center of the disparity image and the center of the object area on the disparity image, a three-dimensional position of the object. The object matching unit 630 executes comparison matching, for each object area detected from a captured image of one frame, with a data list, which is in an object data list 632, which has a value of a stabilization flag S of 0 (S=0), and which is not a target to be tracked.

Object data detected in the past image detection processing are stored in the object data list 632. The object data list 632 includes, in addition to the latest information on the detected object data (the latest position, size, distance, relative velocity, and disparity information): object prediction data (information predicting at which position the object is in the next frame captured); object feature data used in the tracking unit 604 or the object matching unit 630; the number of detected/undetected frames indicating the number of frames, in which the object has been detected, or the number of frames, over which the object has continuously been not detected; and likelihood of necessity of tracking (stabilization flag: S) indicating whether the object is a target to be tracked.

Next, processing of each function illustrated by use of FIG. 4 and FIG. 5 will be described more specifically. FIG. 6 is a diagram illustrating, together with a captured image, a U-map generated by the U-map generating unit 614. This U-map is a two-dimensional histogram representing frequency along a Z-axis (by density or color), with its horizontal axis representing x of a disparity image, and its vertical axis representing disparity d of the disparity image.

For convenience of explanation, the term, "map", is used herein, but, it should be understood that a map or image-like information is not actually formed, and for example, an information group representing a two-dimensional distribution of objects, by which their lateral direction positions and their depth direction positions are associated with each other, is formed. The same applies to the V-map.

The U-map generating unit 614 votes, based on values of (x, d), a point (x, y, d) in the disparity image, the point (x, y, d) having a height from a road surface in a predetermined height range (for example, 20 cm to 3 m). For points (x, y, d) in the disparity image, a U-map is generated by voting being executed for pixels of a predetermined range, for example, ⅚ toward the ground of the area of the image. This is because the top ⅙ of the disparity image is, in most cases, an image having the sky taken therein, and often has no objects to be recognized, taken therein.

Figure 6A:
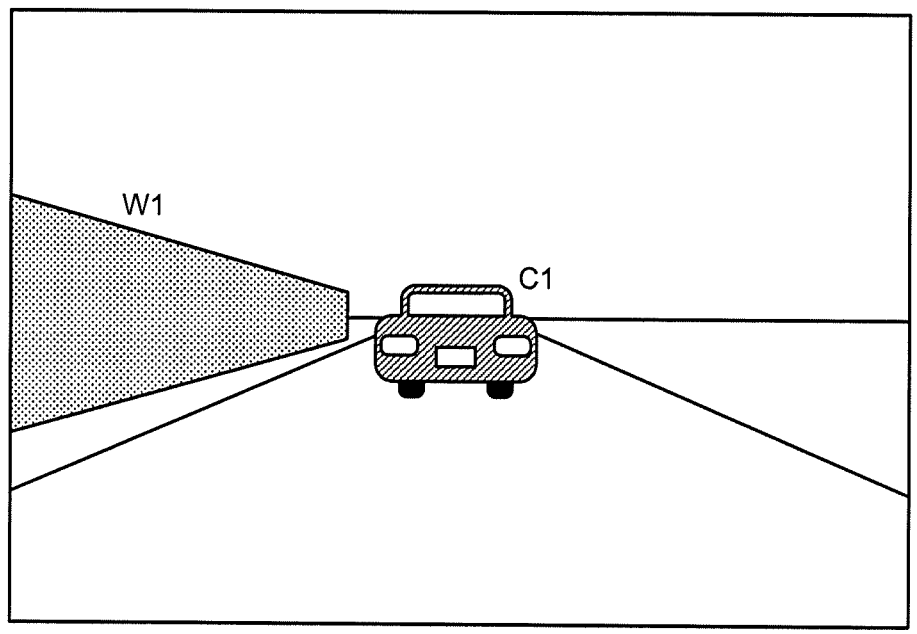
FIG. 6A is a diagram illustrating a captured image.
Figure 6B:
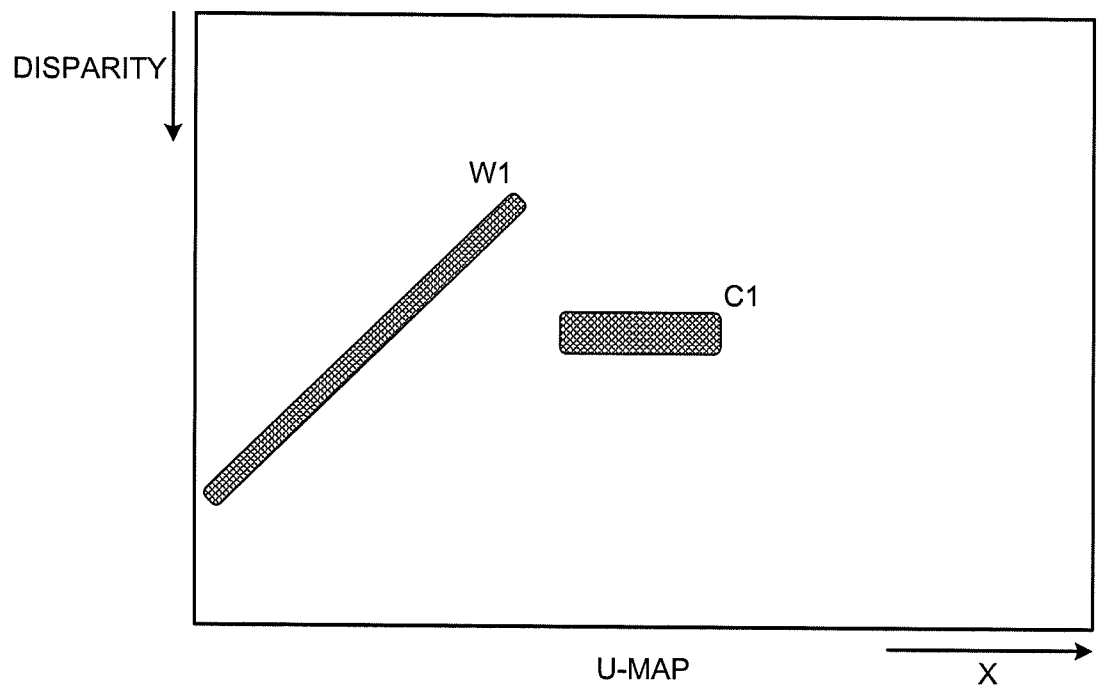
FIG. 6B is a diagram illustrating a U-map generated by a U-map generating unit.

In a luminance image illustrated in FIG. 6A, since there is a wall on the left side and there is one car on the roadway, its U-map is generated as illustrated in FIG. 6B. In FIG. 6B, the wall is an area on a straight line extending from the left to the central upper portion.

Figure 7A:
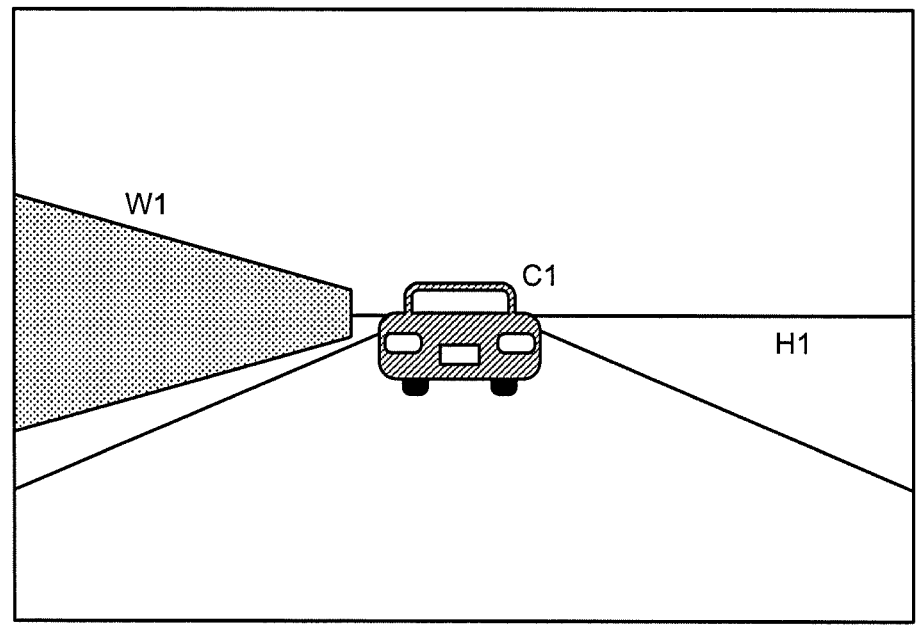
FIG. 7A is a diagram illustrating the captured image.
Figure 7B:
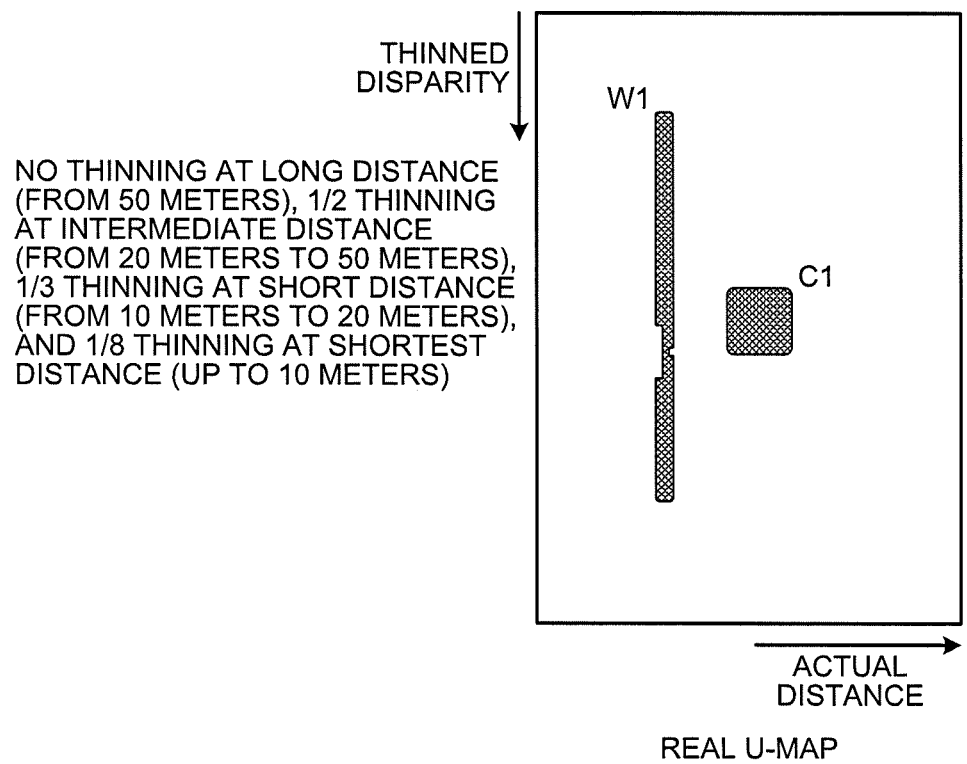
FIG. 7B is a diagram illustrating a real U-map generated by a real U-map generating unit.

FIGS. 7A and 7B are diagrams illustrating, together with the captured image, a real U-map generated by the real U-map generating unit 616. The real U-map results from conversion of the horizontal axis of the above described U-map in pixel units of the image, to units of actual distance (for example, distance from a straight line extending in the vertical direction on the captured image). That is, the horizontal axis of the real U-map corresponds to distance in a lateral direction of the captured image. Further, the vertical axis of the real U-map corresponds to disparity that has been subjected to thinning described later. Since the disparity corresponds to distance in the depth direction, the real U-map is a map associating disparity appearance frequency with values respectively corresponding to the lateral direction distance and depth direction distance.

In this real U-map, the horizontal axis and the vertical axis preferably represent values corresponding to the lateral direction distance and the depth direction distance, respectively. For example, instead of the disparity along the vertical axis, the distance in the depth direction may be used, and instead of the lateral direction distance along the horizontal axis, the lateral direction distance compressed by a predetermined magnification, or the like, may be used. For convenience, explanation is made herein by use of the vertical axis and the horizontal axis, but as long as the values are associated with each other, whether or not the values are represented on axes does not matter.

Further, in the real U-map, units of thinned disparity, for which a thinning rate according to distance from the disparity on the U-map is used, are used for the vertical axis. In the long distance, objects appear small and the distance resolution is low due to less disparity information; and thus thinning is not performed therefor. On the contrary, in the short distance, objects are captured largely, there is much disparity information, and the distance resolution is high; and thus the vertical axis is able to be subjected to thinning largely.

On the real U-map illustrated in FIG. 7B, the wall is represented by a (vertical) linear area extending upward, and a shape of a back surface of the car is represented. The real U-map generating unit 616 generates a real U-map (a small U-map) having a low resolution, for detection of a continuous three-dimensional object. Further, the real U-map generating unit 616 also generates a real U-map having a high resolution, for detection of a non-continuous three-dimensional object. That is, the real U-map generating unit 616 generates two types of real U-maps, the low resolution real U-map and the high resolution real U-map.

Figure 8:
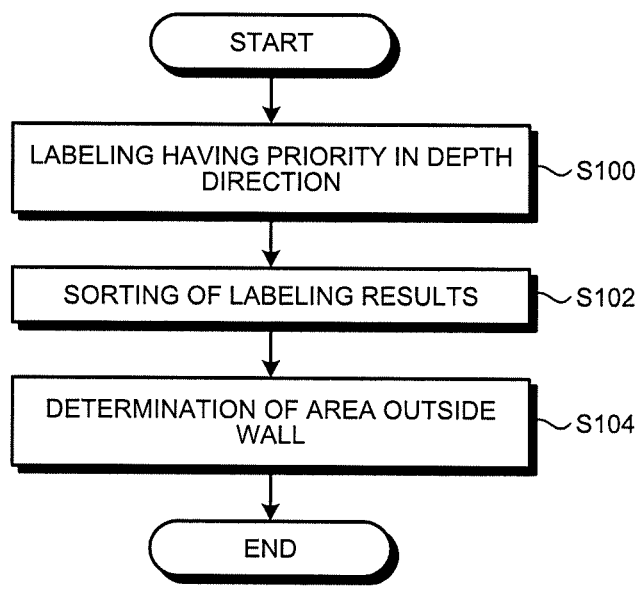
FIG. 8 is a flow chart illustrating an outline of processing by a wall detecting unit corresponding to a detecting unit, a determining unit, and an area determining unit.

FIG. 8 is a flow chart illustrating an outline of processing of the wall detecting unit 618 corresponding to the detecting unit 52, the determining unit 54, and the area determining unit 56. As illustrated in FIG. 8, the wall detecting unit 618 firstly executes labeling (having priority in the depth direction) of assigning the same label to pixels that are continuous in the depth direction (S100). Next, the wall detecting unit 618 executes sorting (wall detection) of results of the labeling (S102). The wall detecting unit 618 then determines an area outside a wall (S104).

Figure 9:
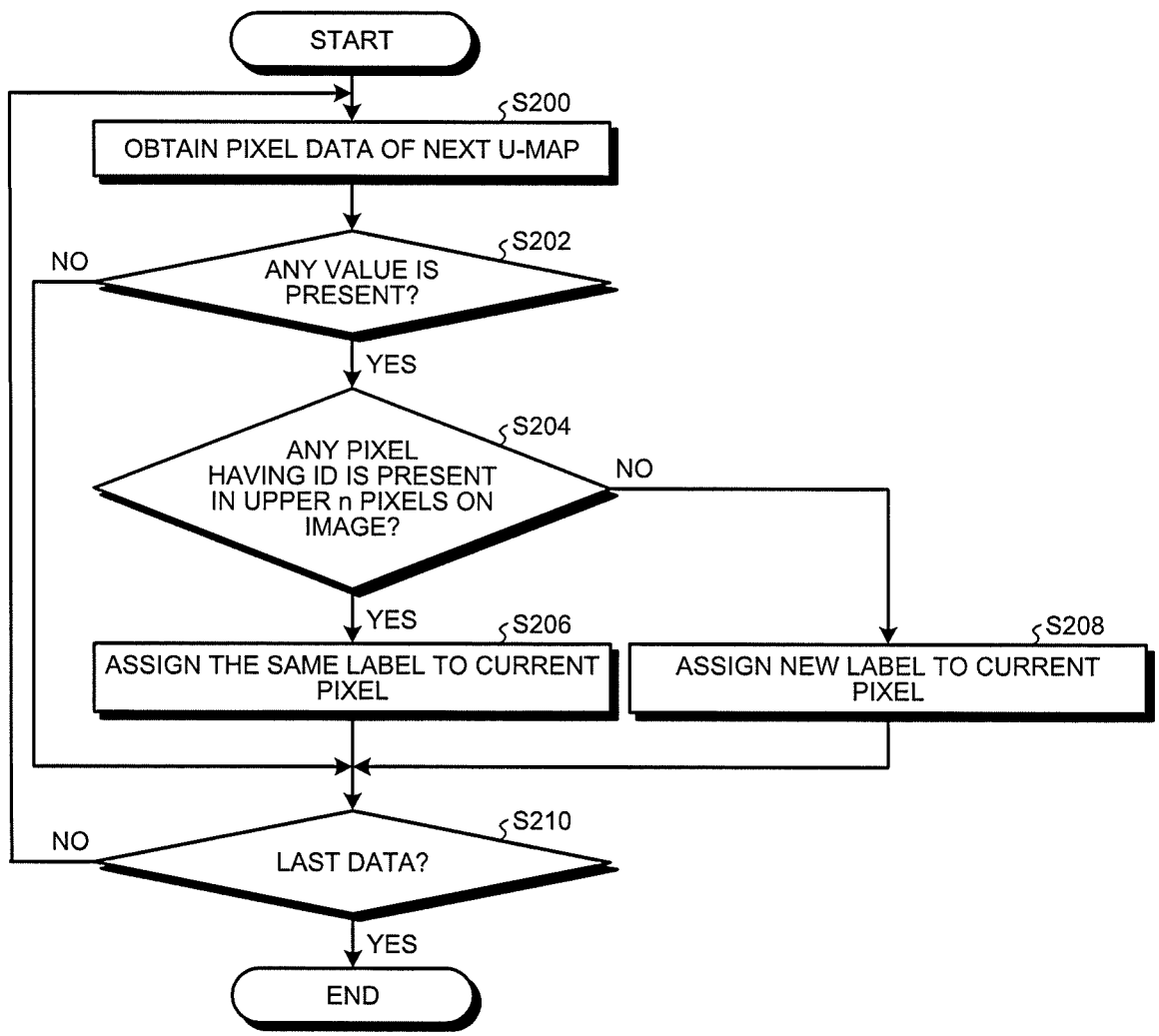
FIG. 9 is a flow chart exemplifying processing executed by the wall detecting unit.

Next, processing executed by the wall detecting unit 618 will be described in detail. FIG. 9 is a flow chart exemplifying the processing (FIG. 8: S100) executed by the wall detecting unit 618. Firstly, the wall detecting unit 618 obtains pixel data of the next U-map (to be processed) (S200).

The wall detecting unit 618 determines whether or not a value (a vote) is present in the pixel data of the U-map (S202), and if a value is present (S202: Yes), the wall detecting unit 618 proceeds to processing of S204, and if a value is not present (S202: No), the wall detecting unit 618 proceeds to processing of S210.

The wall detecting unit 618 determines whether or not a pixel having an ID (a label) is present in upper n pixels (in the vertical axis direction) on the image (S204). Herein, "n" is an allowable number of pixels regarded as being continuous even if pixels are apart. If the wall detecting unit 618 determines that a pixel having an ID is present (S204: Yes), the wall detecting unit 618 assigns the same label to the current pixel (S206). Further, if the wall detecting unit 618 determines that a pixel having an ID is not present (S204: No), the wall detecting unit 618 assigns a new label to the current pixel (S208).

The wall detecting unit 618 determines whether or not the image data are the last data on the image (S210); and if the image data are the last data (S210: Yes), the wall detecting unit 618 ends the processing, and if the image data are not the last data (S210: No), the wall detecting unit 618 returns to the processing of S200.

Figure 10A:
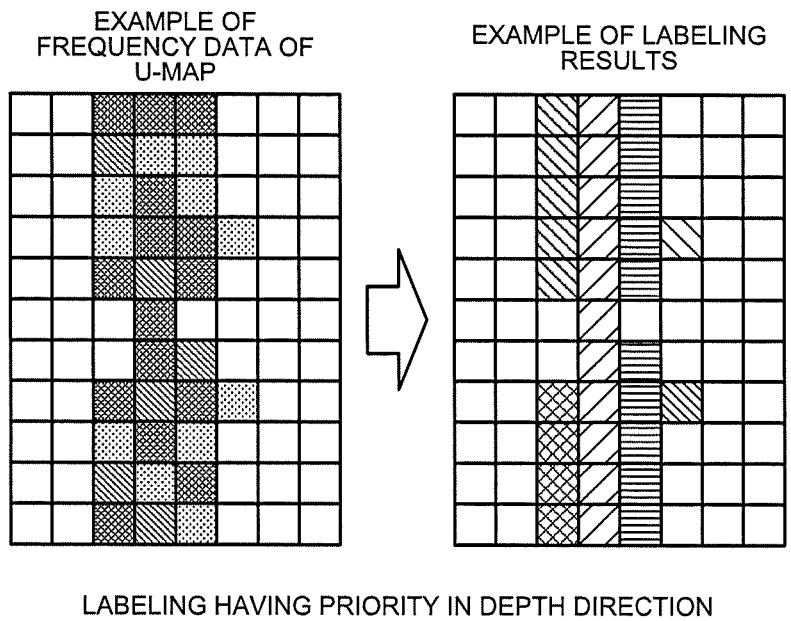
FIGS. 10A and 10B are diagrams illustrating a specific example of labeling executed by the wall detecting unit.
Figure 10B:
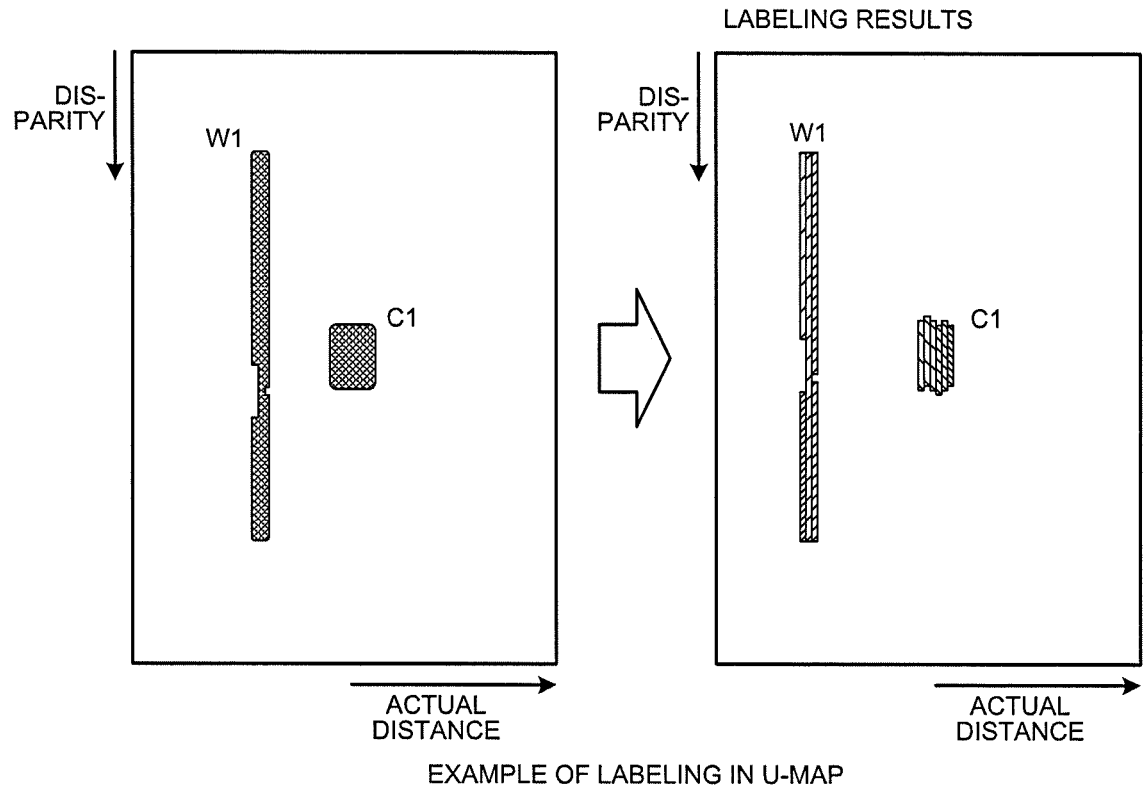

FIGS. 10A and 10B are diagrams illustrating a specific example of the labeling executed by the wall detecting unit 618. In normal labeling, labeling is executed by determination of whether pixels are adjacent to one another in eight neighboring or four neighboring pixels, but the wall detecting unit 618 executes labeling having priority in the depth direction by determination of connection among pixels in an up-down direction (the vertical axis direction) of the small U-map.

Further, the wall detecting unit 618 improves connectivity in the depth direction by determining connection by application of the above described allowable number of pixels n, even if there is a gap in the depth direction. For example, the detecting unit 52 regards a gap up to n pixels on the small U-map as connection. Or, the detecting unit 52 regards a gap on the small U-map to be continuity if an actual distance converted from the gap is equal to or less than X m.

FIG. 10A illustrates a labeling example of the labeling having priority in the depth direction. In this example of FIG. 10A, n=1, by use of the allowable number of pixels n. Therefore, to data of the fifth column from the left in FIG. 10A, the same label has been assigned. Further, since data of the third column from the left are apart by two pixels, different labels have been assigned to upper and lower parts thereof. Therefore, in FIG. 10A, six vertically long labels have been assigned to lumps of disparity frequency on the small U-map.

FIG. 10B illustrates a labeling example in a case like the example illustrated in FIG. 7. Herein, results where an object long in the depth direction like a wall is formed of plural long labels, and a car is assigned with short labels that are different among columns, are obtained.

Figure 11:
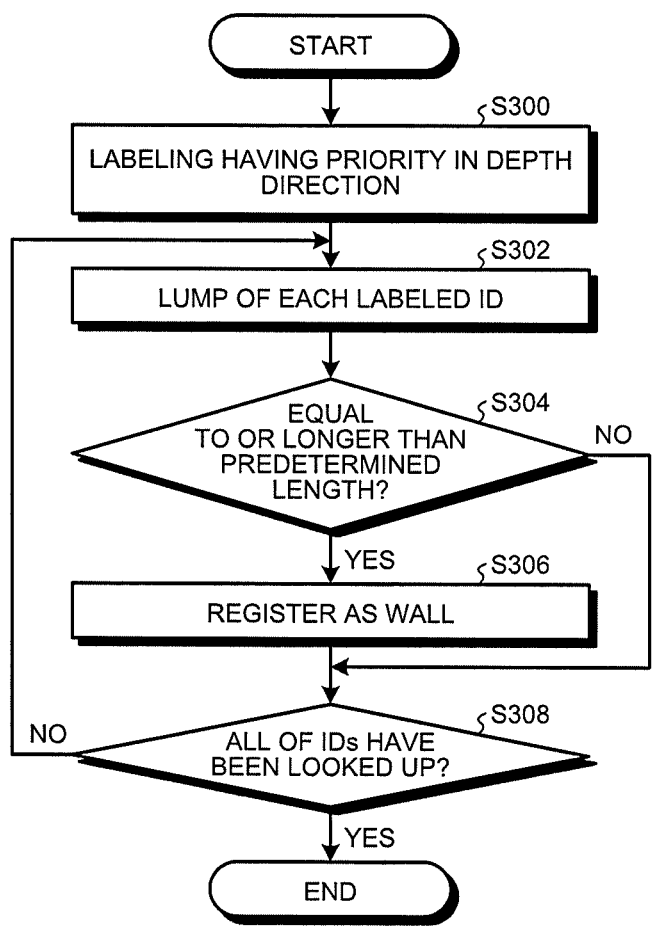
FIG. 11 is a flow chart exemplifying processing executed by the determining unit.

FIG. 11 is a flow chart exemplifying determination processing (FIG. 8: S102) executed by the wall detecting unit 618. Firstly, the wall detecting unit 618 obtains results of the labeling having priority in the depth direction (S300).

Figure 12:
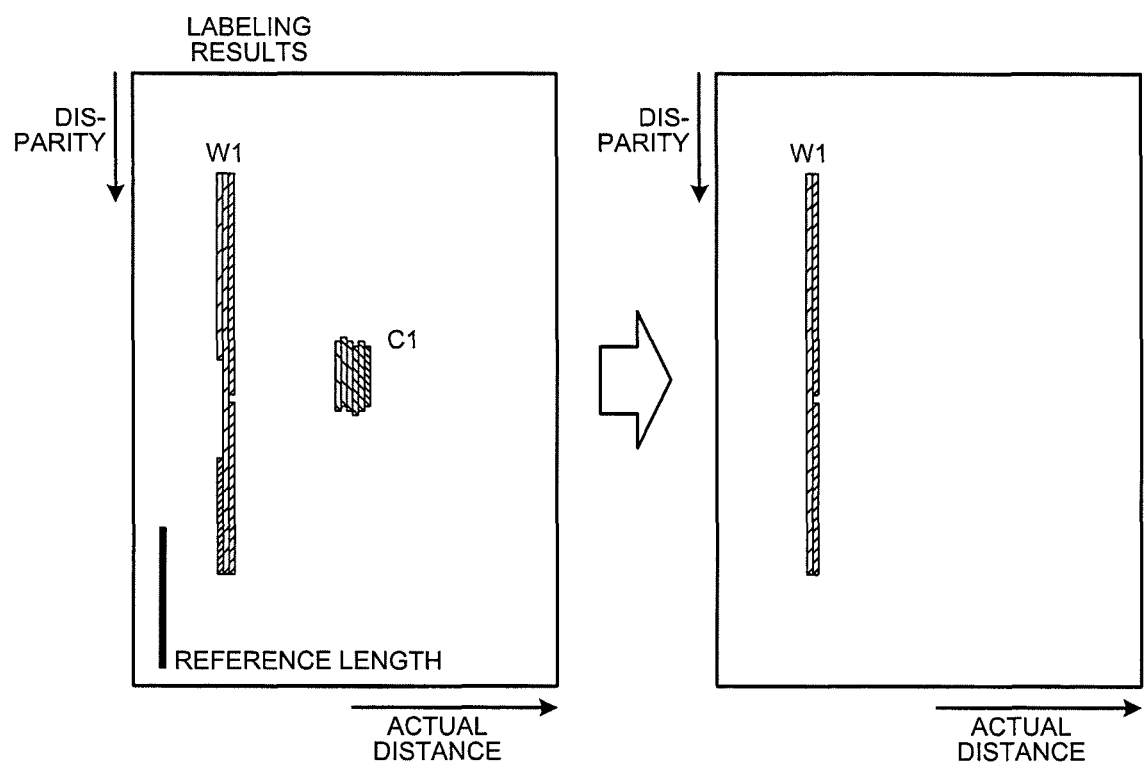
FIG. 12 is a diagram illustrating a wall detected by the determining unit.

The wall detecting unit 618 selects one of lumps of the labeled IDs (S302), and determines whether or not the selected lump is equal to or longer than a predetermined length (a reference length serving as a threshold) in the vertical axis direction (S304). If the wall detecting unit 618 determines that the selected lump is equal to or longer than the predetermined length (S304: Yes), the wall detecting unit 618 registers the lump as a wall (S306); and if the wall detecting unit 618 determines that the selected lump is not equal to or longer than the predetermined length (S304: No), the wall detecting unit 618 proceeds to processing of S308. That is, if the lump of the ID is equal to or longer than the reference length, the wall detecting unit 618 detects the lump as a wall (see FIG. 12).

Figure 13A:
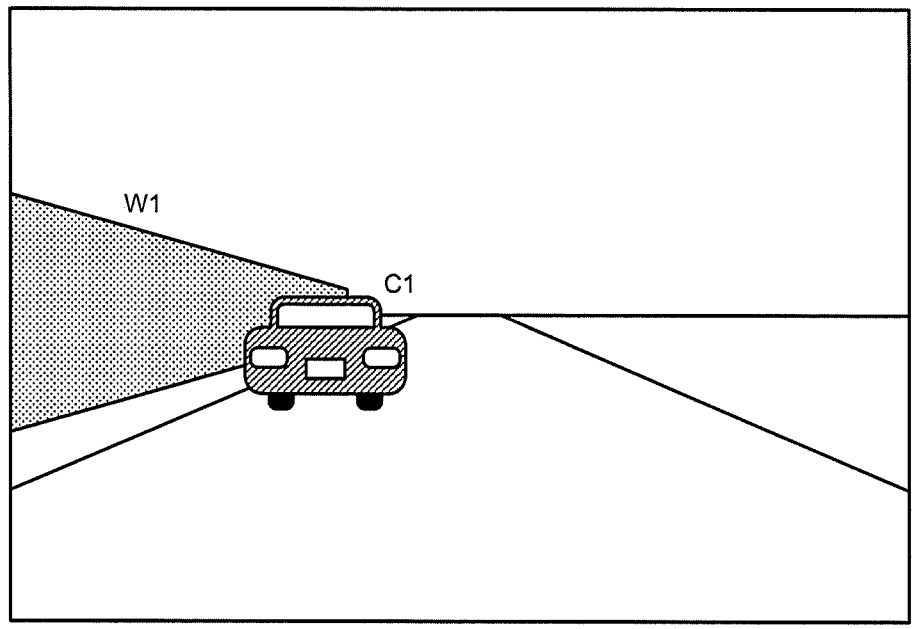
FIGS. 13A and 13B are diagrams illustrating an example where labeling executed by the wall detecting unit is effective for wall detection by the determining unit.
Figure 13B:
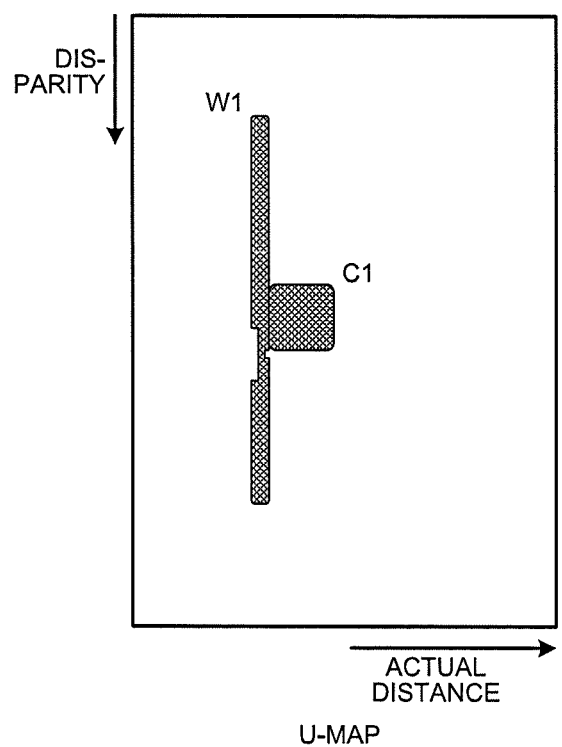

The wall detecting unit 618 determines whether or not all of the IDs have been looked up (S308); and if the wall detecting unit 618 determines that all of the IDs have been looked up (S308: Yes), the wall detecting unit 618 ends the processing, and if the wall detecting unit 618 determines that all of the IDs have not been looked up (S308: No), the wall detecting unit 618 returns to the processing of S302. FIGS. 13A and 13B are diagrams illustrating an example where labeling executed by the wall detecting unit 618 is effective for wall detection. Small U-maps are low in horizontal axis resolution. Therefore, an object positioned near a wall, as illustrated in FIG. 13, may be in a state of being in contact with the wall. In this case also, the wall detecting unit 618 executes labeling having priority in the depth direction, assigns a different label to each column, and executes determination on each column by using the reference length (reference ruler); and thus the wall is able to be detected.

Figure 14A:
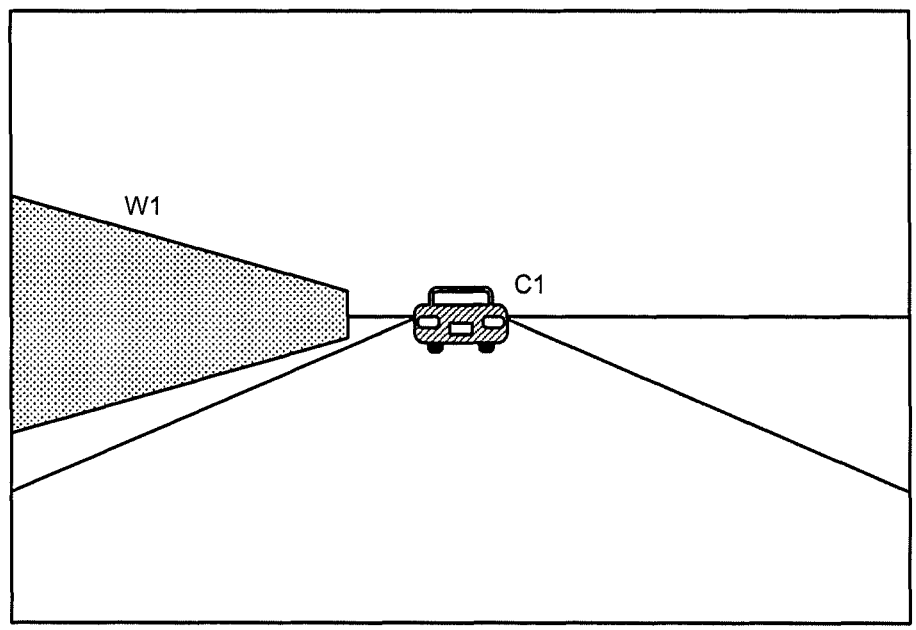
FIGS. 14A, 14B, and 14C are diagrams illustrating operation of the determining unit.
Figure 14B:
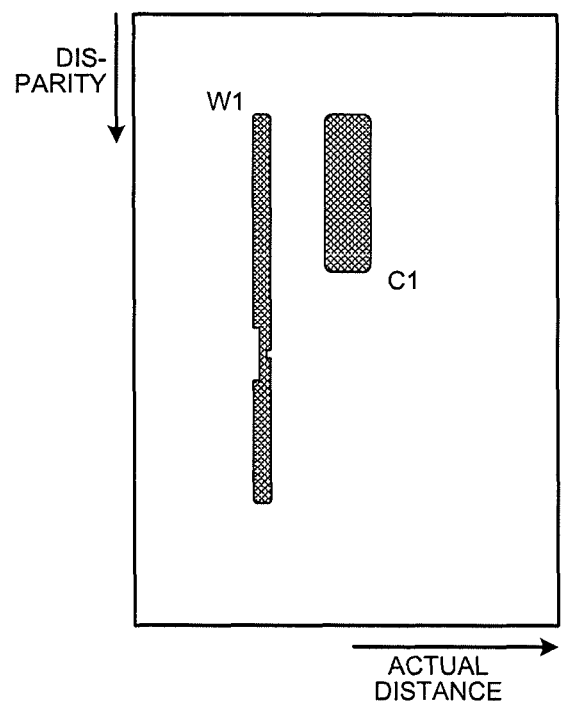
Figure 14C:
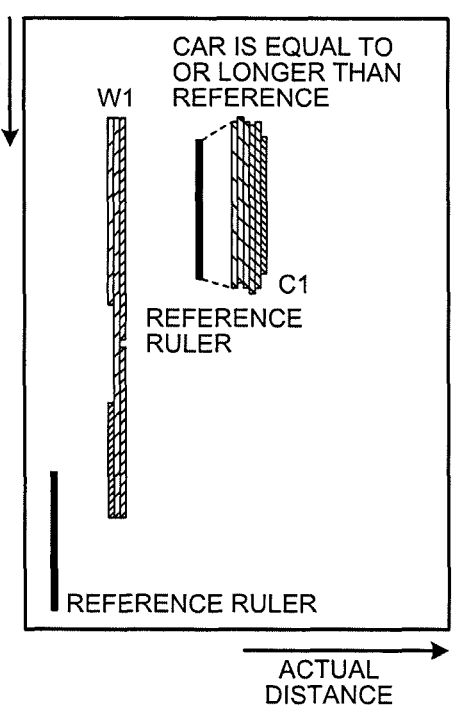
Figure 15A:
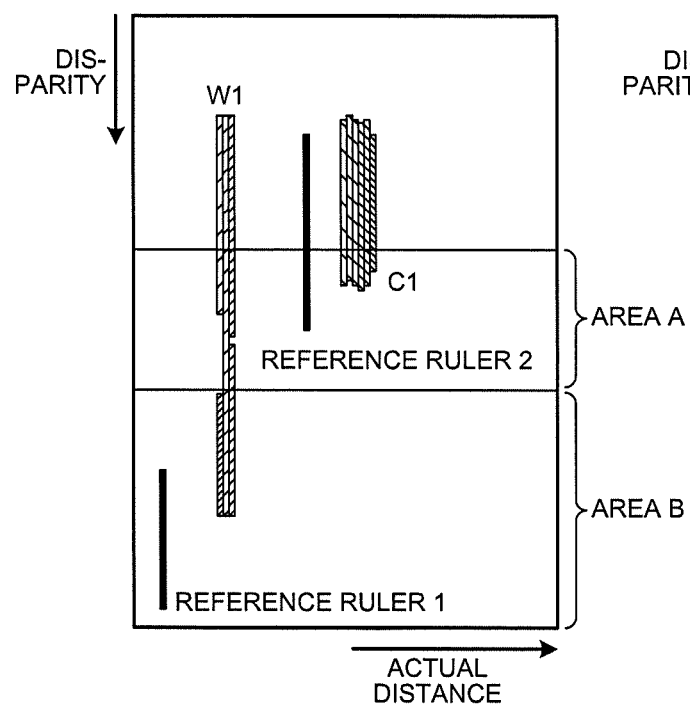
FIGS. 15A and 15B are diagrams illustrating a modification of the operation of the determining unit.
Figure 15B:
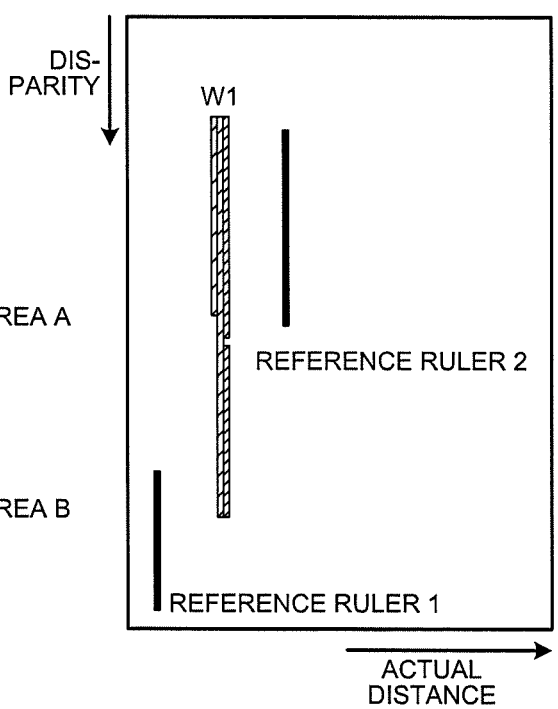

FIGS. 14A, 14B, and 14C are diagrams illustrating the above described determination operation by the wall detecting unit 618. FIGS. 15A and 15B are diagrams illustrating a modification of the determination operation. The wall detecting unit 618 determines continuity of data that are long in the depth direction on a small U-map, but due to dispersion of disparity, distant objects extend long on small U-maps. Therefore, the wall detecting unit 618 may set areas according to distance without executing wall determination (FIGS. 14A to 14C) by use of the same reference ruler for the whole small U-map, and may execute determination (FIGS. 15A and 15B) by using a different reference ruler according to in which area a starting point of a lump of an ID is included. In an example illustrated in FIGS. 15A and 15B, since a reference ruler is set long when a starting point is present distantly, a non-continuous three-dimensional object (for example, an automobile or a human) is prevented from being detected as a wall.

Figure 16:
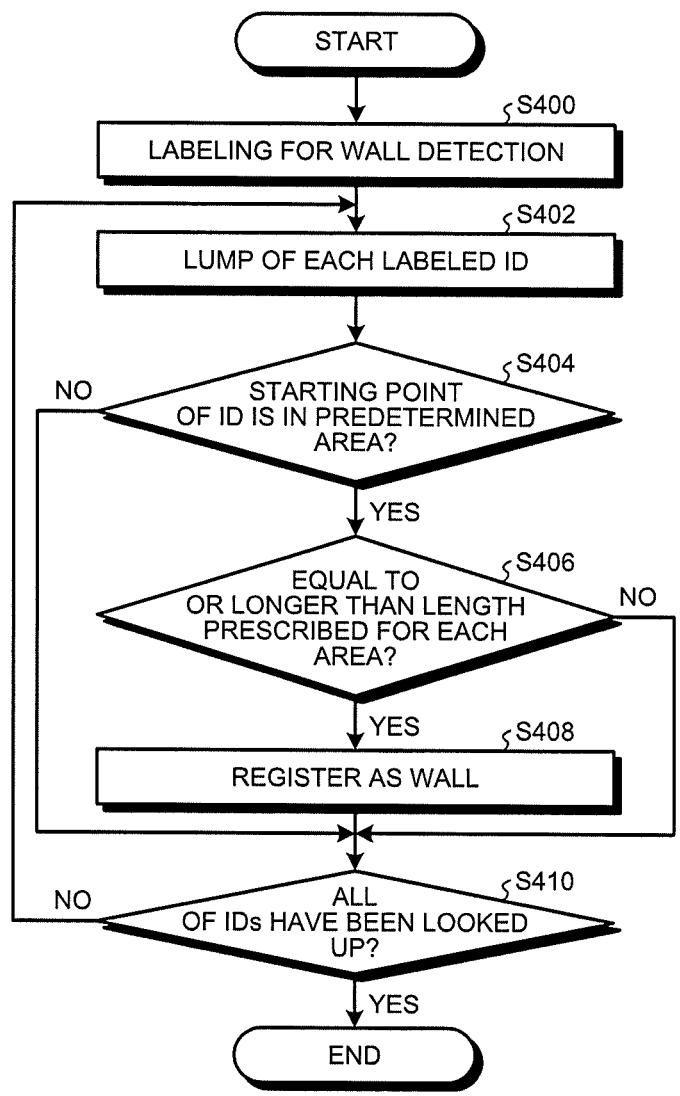
FIG. 16 is a flow chart illustrating a flow of processing when the wall detecting unit executes determination operation illustrated in FIGS. 15A and 15B.

FIG. 16 is a flow chart illustrating a flow of processing when the wall detecting unit 618 executes the determination operation illustrated in FIGS. 15A and 15B. As illustrated in FIG. 16, the wall detecting unit 618 obtains results of the labeling (labeling for wall detection) having priority in the depth direction (S400).

The wall detecting unit 618 selects one of lumps of the labeled IDs (S402), and determines whether or not a starting point of the ID is in any of predetermined areas (S404). The predetermined areas refer to areas serving as targets of determination having reference lengths prescribed therefor respectively. If the wall detecting unit 618 determines that the starting point of the ID is in any of the predetermined areas (S404: Yes), the wall detecting unit 618 proceeds to processing of Step S406; and if the wall detecting unit 618 determines that the starting point of the ID is not in any of the predetermined areas (S404: No), the wall detecting unit 618 proceeds to processing of Step S410.

The wall detecting unit 618 determines whether or not the selected lump is equal to or longer than a length prescribed for that area (S406). If the wall detecting unit 618 determines that the selected lump is equal to or longer than the length prescribed for that area (S406: Yes), the wall detecting unit 618 registers the lump as a wall (S408); and if the wall detecting unit 618 determines that the selected lump is not equal to longer than the length prescribed for that area (S406: No), the wall detecting unit 618 proceeds to the processing of Step S410. That is, if the lump of the ID is equal to or longer than the length prescribed for that area, the wall detecting unit 618 detects the lump as a wall.

The wall detecting unit 618 determines whether or not all of the IDs have been looked up (S410); and if the wall detecting unit 618 determines that all of the IDs have been looked up (S410: Yes), the wall detecting unit 618 ends processing, and if the wall detecting unit 618 determines that all of the IDs have not been looked up (S410: No), the wall detecting unit 618 returns to the processing of S402.

Figure 17:
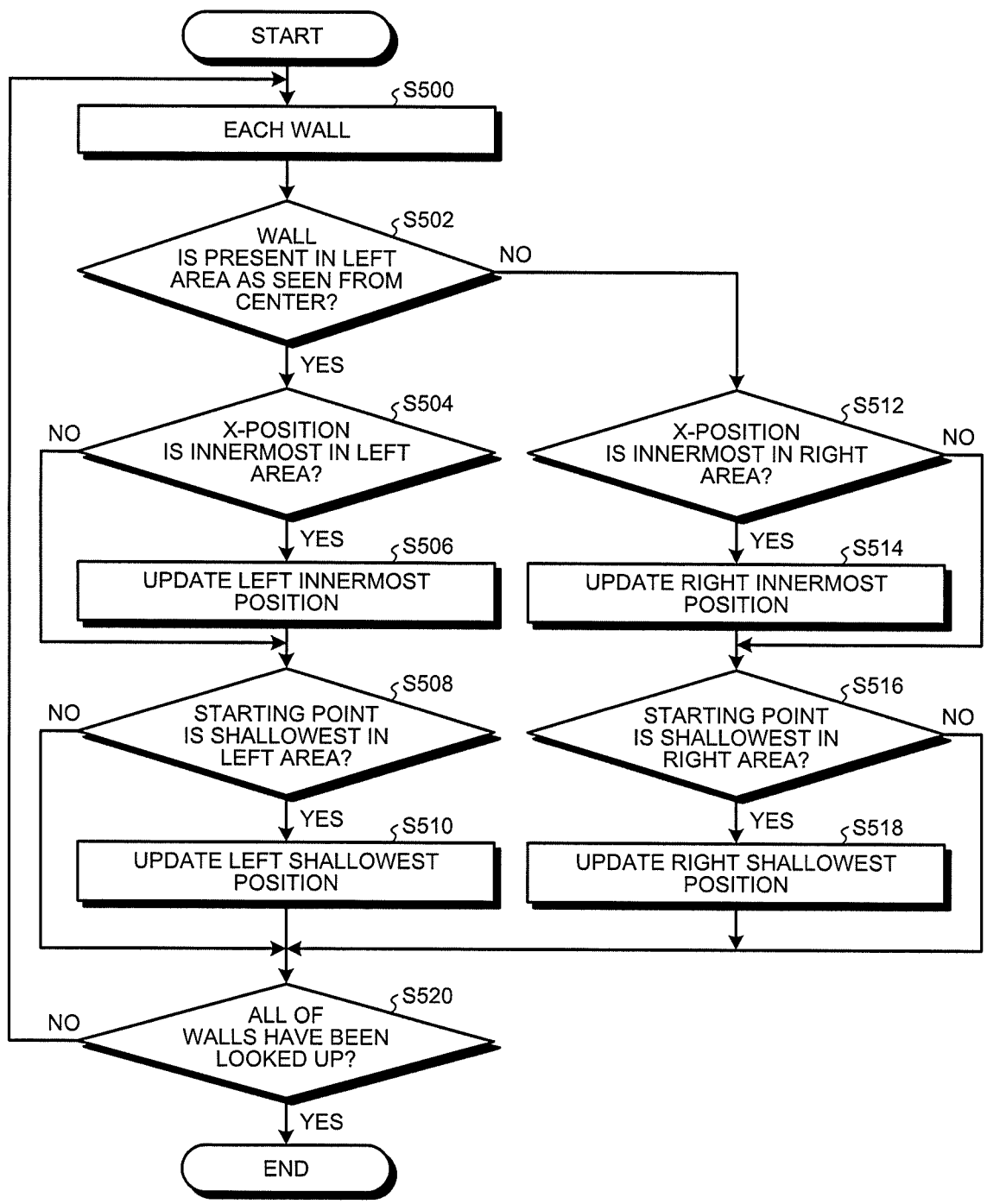
FIG. 17 is a flow chart exemplifying processing executed by the area determining unit.

FIG. 17 is a flow chart illustrating a flow of area determination processing (FIG. 8: S104) executed by the area determining unit 56. FIGS. 18A and 18B are diagrams illustrating results of the area determination processing executed by the area determining unit 56. The area determining unit 56 stores data representing each wall, the data serving as determination results (S500).

The area determining unit 56 determines whether or not the wall detected (the lump of the ID) is present in a left area as viewed from the center of the image (or the real U-map) (S502). The center of the image (or the real U-map) refers to a central line of the image (or the real U-map) extending in the vertical axis direction. More specifically, the center of the image (or the real U-map) corresponds to a central line of the stereo camera 2. If the area determining unit 56 determines that the wall is present in the left area (S502: Yes), the area determining unit 56 proceeds to processing of Step S504; and if the area determining unit 56 determines that the wall is not present in the left area (S502: No), the area determining unit 56 proceeds to processing of Step S512.

The area determining unit 56 determines whether or not an X-position of the wall is the innermost in the left area (S504); and if the area determining unit 56 determines that the X-position is the innermost therein (S504: Yes), the area determining unit 56 proceeds to processing of Step S506, and updates data indicating the left innermost position. If the area determining unit 56 determines that the X-position is not the innermost therein (S504: No), the area determining unit 56 proceeds to processing of Step S508.

The area determining unit 56 determines whether or not a starting point of the wall is the shallowest in the left area (S508); and if the area determining unit 56 determines that the starting point is the shallowest therein (S508: Yes), the area determining unit 56 proceeds to processing of Step S510, and updates data indicating the left shallowest position. If the area determining unit 56 determines that the starting position is not the shallowest therein (S508: No), the area determining unit 56 proceeds to processing of Step S520.

The area determining unit 56 determines whether or not the X-position of the wall is the innermost in a right area (S512); and if the area determining unit 56 determines that the X-position is the innermost therein (S512: Yes), the area determining unit 56 proceeds to processing of Step S514, and updates data indicating the right innermost position. If the area determining unit 56 determines that the X-position is not the innermost therein (S512: No), the area determining unit 56 proceeds to processing of Step S516.

The area determining unit 56 determines whether or not the starting point of the wall is the shallowest in the right area (S516); and if the area determining unit 56 determines that the starting point is the shallowest therein (S516: Yes), the area determining unit 56 proceeds to processing of Step S518, and updates data indicating the right shallowest position. If the area determining unit 56 determines that the starting position is not the shallowest therein (S516: No), the area determining unit 56 proceeds to the processing of Step S520.

The area determining unit 56 determines whether or not all of the walls have been looked up (S520); and if the area determining unit 56 determines that all of the walls have been looked up (S520: Yes), the area determining unit 56 ends the processing, and if the area determining unit 56 determines that all of the walls have not been looked up (S520: No), the area determining unit 56 returns to the processing of S500 and starts processing on the next wall.

The area determining unit 56 then determines an object detection target area, in which any object (any non-continuous three-dimensional object) is to be detected, in the time series stereo images. Specifically, an area excluding the wall and an area outside the wall (a rectangle circumscribing the wall) is the object detection target area. That is, the area determining unit 56 determines an area surrounded by a continuous pixel area determined to be representing a continuous three-dimensional object, as the object detection target area.

Second Embodiment

Next, a device control system according to a second embodiment will be described. The device control system according to this second embodiment performs sorting of lumps of labeling numbers having lengths in a depth direction by using a reference ruler shorter than a reference ruler of a length threshold of final output, when sorting out the depth direction lengths of the lumps of the labeling numbers with the reference ruler, for labeling results obtained by labeling processing in consideration of priority in the depth direction of a small U-map. Final detection results are obtained by integration (connection) of wall candidates obtained by this sorting, through assignment of the same labeling number based on a predetermined condition.

Thereby, when wall candidates short in length with respect to the depth direction appear on a small U-map so as to be close to each other with a gap therebetween due to the number of disparity values appearing on the small U-map being small, the wall candidates are able to be detected as a series of walls by being connected to each other. The second embodiment described below is different from the above described first embodiment in this point only. Therefore, hereinafter, only differences between the first embodiment and the second embodiment will be described, and redundant description thereof will be omitted.

Figure 19:
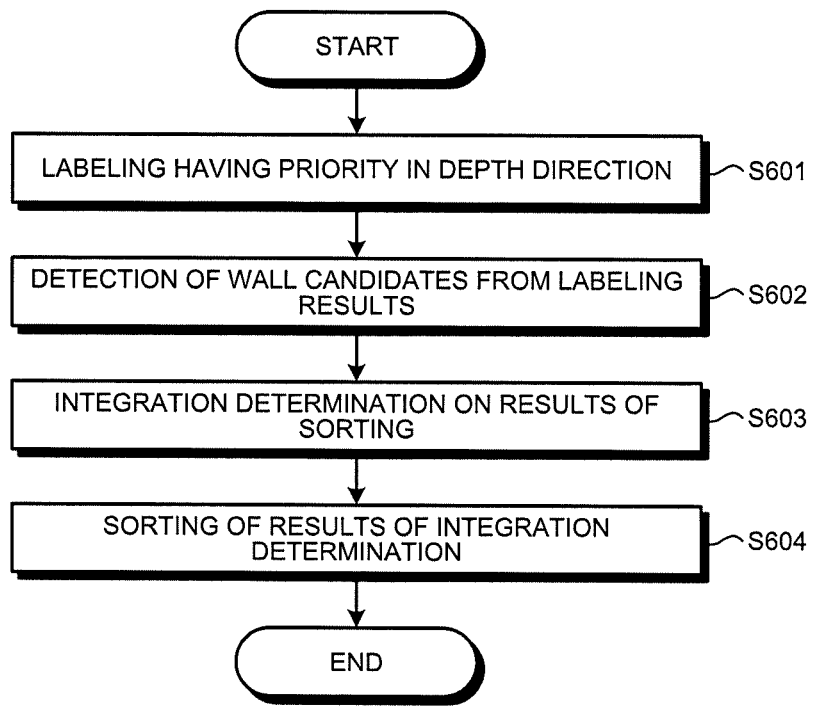
FIG. 19 is a flow chart illustrating a flow of operation of an object detection processing unit in a device control system according to a second embodiment.

A flow chart in FIG. 19 illustrates a flow of operation of the object detection processing unit 5 in the device control system according to the second embodiment. As illustrated in FIG. 19, in this device control system according to the second embodiment, the wall detecting unit 618 firstly executes, at Step S601, the labeling processing having priority in the depth direction, described already with respect to the first embodiment. The wall detecting unit 618 then detects, at Step S602, wall candidates from results of the labeling.

Figure 20A:
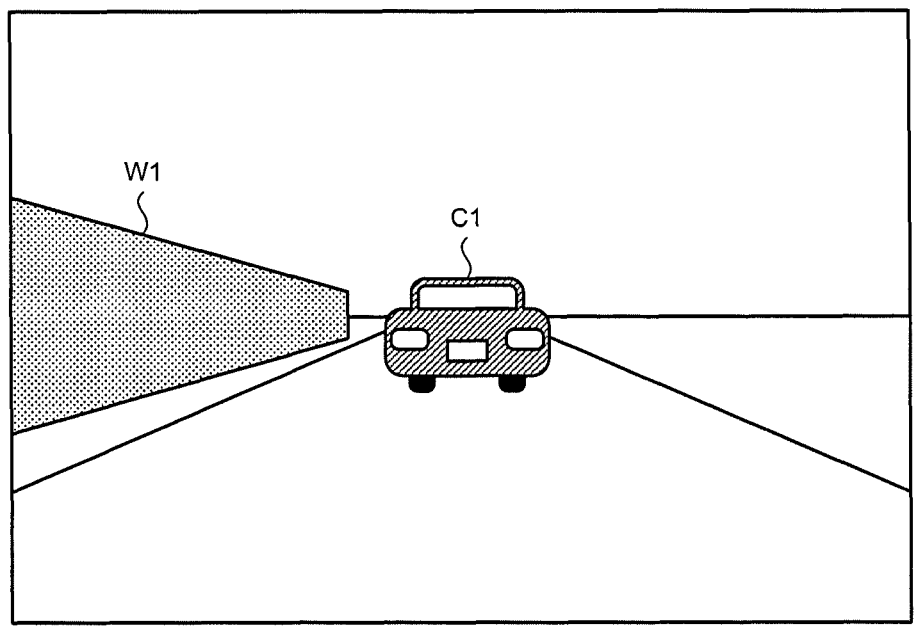
FIGS. 20A, 20B, and 20C are diagrams illustrating how a continuous wall is detected by being divided into plural wall candidates.
Figure 20B:
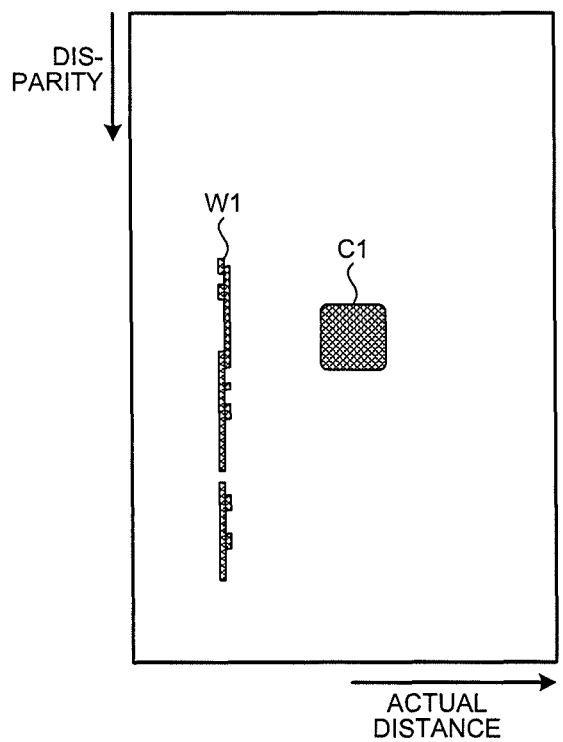
Figure 20C:
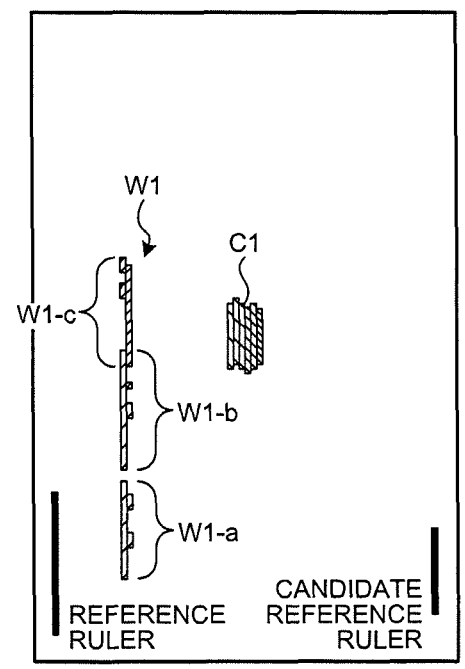

For example, in a case where a captured image (disparity image) is obtained, the captured image having a wall W1 provided therein along a straight road having a preceding vehicle C1 traveling thereon, as illustrated in FIG. 20A, if the disparity value of the wall W1 is small, as illustrated in FIG. 20C, a series of walls W1 is voted on a small U-map fragmentarily as plural wall candidates W1-a to W1-c. FIG. 20C is results (labeling results) of execution of the above described labeling processing on this small U-map. As understood from this FIG. 20C, by the execution of the above described labeling processing, correspondingly to the series of walls W1, the wall candidate W1-a, the wall candidate W1-b, and the wall candidate W1-c, which are short in length, are formed. The wall candidate W1-a, the wall candidate W1-b, and the wall candidate W1-c are the series of walls W1, but at this time point, since these wall candidates are fragmentary objects, they are respectively labeled with different labeling numbers (the labeling numbers of the wall candidate W1-a, the wall candidate W1-b, and the wall candidate W1-c are different from one another).

If wall candidate detection is executed on results of this labeling by use of a reference ruler for final output, a problem that the wall candidate W1-a, the wall candidate W1-b, and the wall candidate W1-c are not detected for being shorter than the length of the reference ruler is caused.

Figure 21:
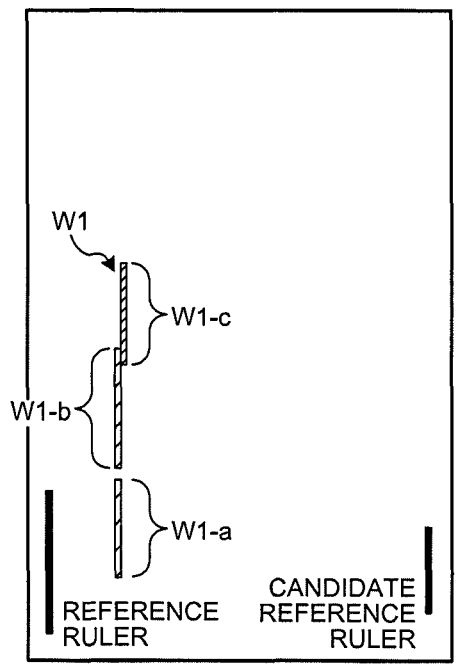
FIG. 21 is a diagram illustrating wall candidates detected based on a candidate reference ruler.

Therefore, in the device control system according to the second embodiment, the wall detecting unit 618 executes wall candidate detection by using "a candidate reference ruler for wall candidate detection", which is a ruler shorter than the reference ruler for final output, illustrated in FIG. 20C. Thereby, since each of the lengths of the wall candidates, which are the wall candidate W1-a, the wall candidate W1-b, and the wall candidate W1-c, is longer than the candidate reference ruler for wall candidate detection, as illustrated in FIG. 21, the wall candidates (the wall candidate W1-a to the wall candidate W1-c) of the wall W1 are able to be detected.

Figure 22A:
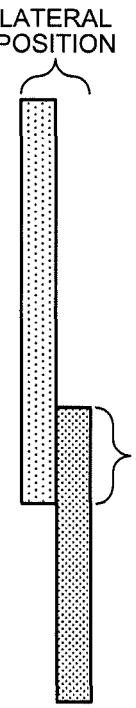
FIGS. 22A, 22B, 22C, 22D, and 22E are diagrams for explanation of integration processing on the wall candidates.

When wall candidate detection is executed by use of the candidate reference ruler for wall candidate detection, the wall detecting unit 618, which is an example of an integrating unit, executes determination (integration determination) of whether or not to integrate (connect) the wall candidate W1-a to wall candidate W1-c, which are fragments of the wall W1, at Step S603. The wall detecting unit 618 executes processing of integrating labeling numbers of wall candidates each having a lateral direction distance or a depth direction distance in a predetermined range, among the wall candidates on the small U-map, into the same labeling number. FIGS. 22A to 22E illustrate examples of conditions to be used in determination of such integration processing. That is, as illustrated in FIG. 22A, the wall detecting unit 618 determines, based on a lateral position and an overlap of neighboring wall candidates, whether or not to integrate the wall candidates.

A "lateral position" is information indicating the number of pixels corresponding to an interval in the lateral direction between wall candidates neighboring each other (by how many pixels the wall candidates are apart in the lateral direction) in the lateral direction on the small U-map. Further, an "overlap" is information indicating the number of pixels corresponding to an interval in the depth direction between wall candidates neighboring each other (by how many pixels the wall candidates are apart in the depth direction) in the depth direction on the small U-map. Although this is just an example, the wall detecting unit 618 executes integration of wall candidates when the lateral position or the overlap is in a predetermined range.

Figure 22B:
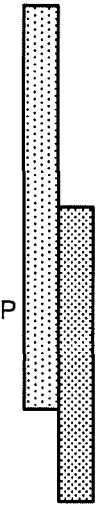

Specifically, FIG. 22B illustrates a case where a lateral direction interval between wall candidates neighboring each other in the lateral direction on a small U-map is 0 pixels (adjacent). In this case, the wall detecting unit 618 integrates the wall candidates together as a series of walls W1 by changing the different labeling numbers assigned to the wall candidates to the same labeling number. That is, if a labeling number, "1", has been assigned to one of the wall candidates, and a labeling number, "2", has been assigned to the other wall candidate, the wall detecting unit 618 reassigns the labeling number, "1", assigned to the one of the wall candidates, to the other wall candidate assigned with the labeling number, "2". Thereby, the labeling numbers of the wall candidates are unified to the labeling number, "1", and the wall candidates are able to be detected as a series of walls.

In this example, when the number of pixels between wall candidates neighboring each other in the lateral direction is less than one, these wall candidates are integrated together. However, the condition for the interval in the lateral direction may be arbitrarily modified according to the design and the like, to, for example, a condition where wall candidates neighboring each other in the lateral direction are integrated together when the number of pixels between the wall candidates is less than two.

Figure 22C:

Similarly, an example in FIG. 22C is an example where a depth direction interval between wall candidates neighboring each other in the depth direction is three pixels. In this case, since the depth direction interval between the wall candidates is less than five pixels, the wall detecting unit 618 assigns the same labeling number to the wall candidates as described above, and integrates the wall candidates into a single object.

Figure 22D:
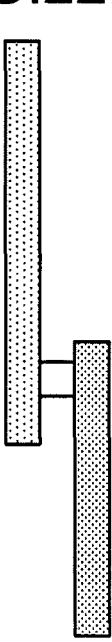
Figure 22E:

In contrast, an example in FIG. 22D is an example where a lateral direction interval between wall candidates neighboring each other in the lateral direction is one pixel. In this case, since the above described condition where "the lateral direction interval between the wall candidates is less than one pixel" is not satisfied, the wall detecting unit 618 respectively processes the wall candidates as different objects without integrating the wall candidates together. Similarly, an example in FIG. 22E is an example where a depth direction gap between wall candidates neighboring each other in the depth direction is six pixels. In this case, since the above described condition where "the depth direction interval between the wall candidates is less than five pixels" is not satisfied, the wall detecting unit 618 respectively processes the wall candidates as different objects without integrating the wall candidates together.

In this example, when the number of pixels between wall candidates neighboring each other in the depth direction is less than five pixels, these wall candidates are integrated together. However, the condition for the interval in the depth direction may be arbitrarily modified according to the design and the like, to, for example, a condition where wall candidates neighboring each other in the depth direction are integrated together in a case where the number of pixels between the wall candidates is less than four pixels or in a case where the number of pixels between the wall candidates is less than seven pixels.

Figure 23:
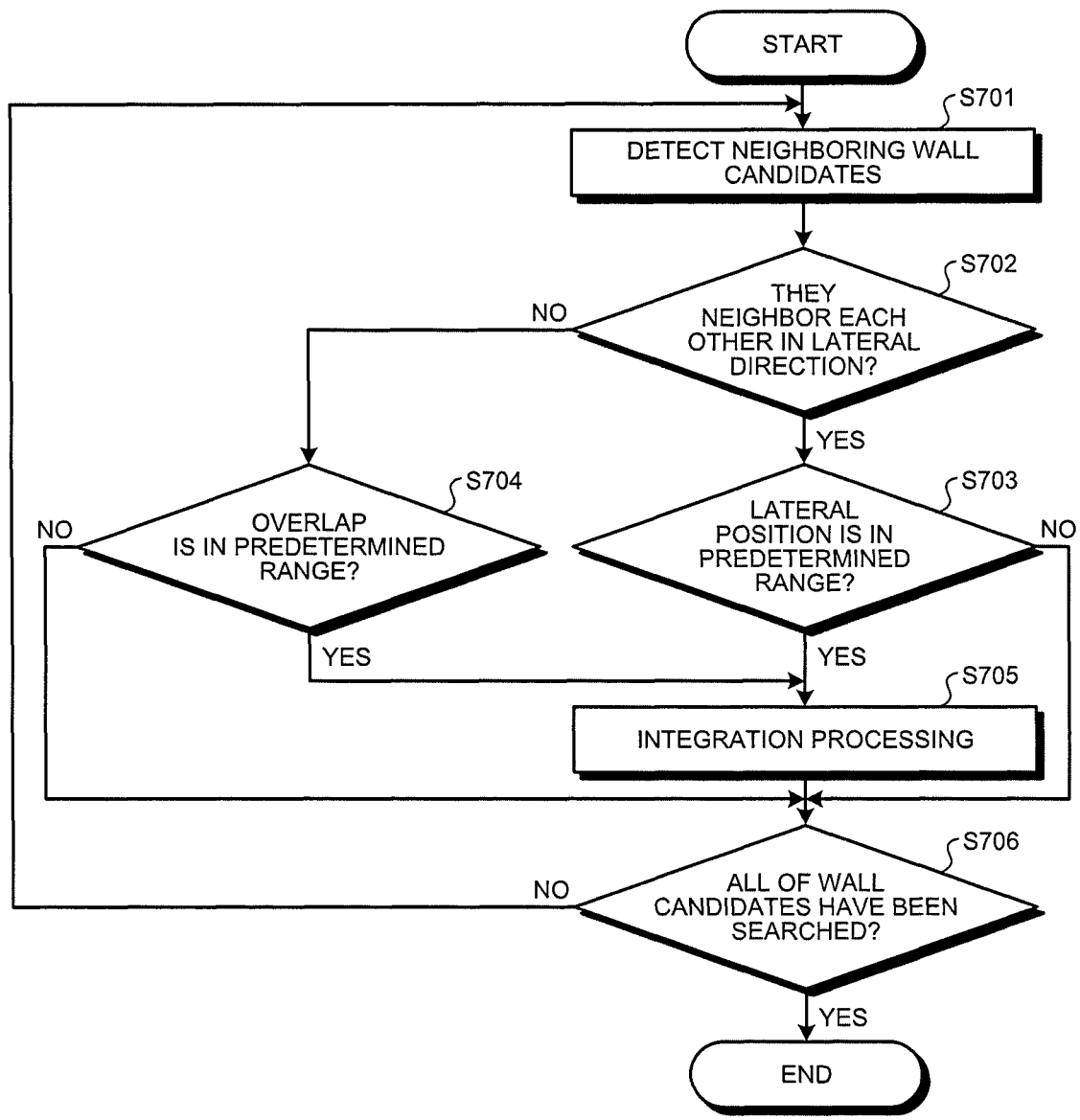
FIG. 23 is a flow chart illustrating a flow of integration processing on the wall candidates by a wall detecting unit.

FIG. 23 is a diagram illustrating a flow of such integration processing in the wall detecting unit 618. When executing integration processing, the wall detecting unit 618 firstly detects, at Step S701 of the flow chart in FIG. 23, wall candidates neighboring each other in the lateral direction or depth direction, from the small U-map, and advances the processing to Step S702. At Step S702, the wall detecting unit 618 determines whether or not the wall candidates detected are wall candidate neighboring each other in the lateral direction.

If they are wall candidates neighboring each other in the lateral direction (Step S702: Yes), the wall detecting unit 618 determines, at Step S703, whether or not a lateral position of the wall candidates is less than one pixel. If the lateral position of the wall candidates is less than one pixel (Step S703: Yes: see FIG. 22B), the wall detecting unit 618 advances the processing to Step S705. At Step S705, since the lateral position of the wall candidates is less than one pixel, the wall detecting unit 618 executes that above described integration processing on the wall candidates.

In contrast, if the lateral position of the wall candidates is not less than one pixel (Step S703: No: see FIG. 22D), the wall detecting unit 618 advances the processing to Step S706 without executing integration processing on the wall candidates. At Step S706, the wall detecting unit 618 determines whether or not search through all of wall candidates on the small U-map has been finished. If the wall detecting unit 618 determines that search through all of the wall candidates on the small U-map has not been finished (Step S706: No), the wall detecting unit 618 returns the processing to Step S701 so as to search for the next wall candidates. In contrast, if the wall detecting unit 618 determines that search through all of the wall candidates on the small U-map has been finished (Step S706: Yes), the wall detecting unit 618 ends the processing illustrated in the flow chart of FIG. 23.

In contrast, the detected wall candidates not being wall candidates neighboring each other in the lateral direction at Step S702 (Step S702: No) means that the detected wall candidates are wall candidates neighboring each other in the depth direction. Thus, the wall detecting unit 618 advances the processing to Step S704, and determines whether or not the overlap of the wall candidates is less than five pixels. If the wall detecting unit 618 determines that the overlap of the wall candidates is less than five pixels (Step S704: Yes: see FIG. 22C), the wall detecting unit 618 advances the processing to Step S705, and executes the above described integration processing on the wall candidates neighboring each other in the depth direction.

In contrast, if the wall detecting unit 618 determines that the overlap of the wall candidates is equal to or greater than five pixels (Step S704: No: see FIG. 22E), the wall detecting unit 618 advances the processing to Step S706 without executing integration processing on the wall candidates. At Step S706, the wall detecting unit 618 determines whether or not search through all of the wall candidates on the small U-map has been finished. If the wall detecting unit 618 determines that search through all of the wall candidates on the small U-map has not been finished (Step S706: No), the wall detecting unit 618 returns the processing to Step S701 so as to search for the next wall candidates. In contrast, if the wall detecting unit 618 determines that search through all of the wall candidates on the small U-map has been finished (Step S706: Yes), the wall detecting unit 618 ends the processing illustrated in the flow chart of FIG. 23.

Figure 24:
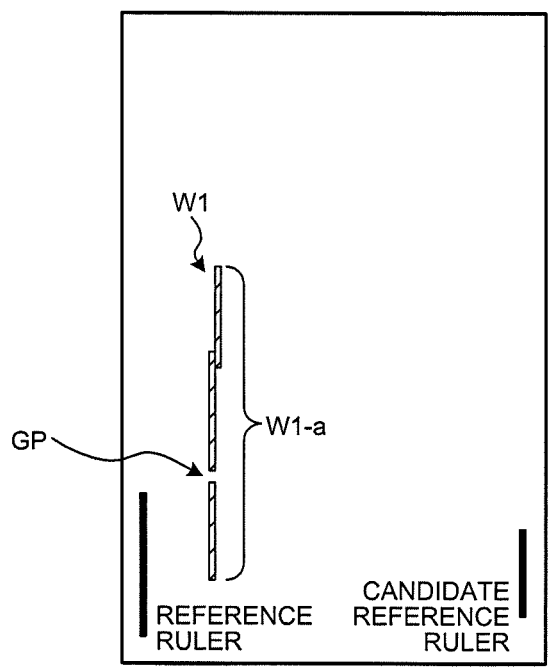
FIG. 24 is a diagram illustrating a small U-map that has been subjected to labeling processing, the small U-map serving as results of integration processing.

FIG. 24 illustrates a small U-map after labeling processing, the small U-map serving as results of such integration processing. The wall W1 illustrated in FIG. 24 illustrates that the wall candidates W1-a to W1-c have been subjected to integration processing with the labeling number of the wall candidate W1-a. Thereby, the wall candidates W1-a to W1-c are able to be detected as a series of walls.

Further, if a gap portion GP illustrated in FIG. 24 is generated between wall candidates by execution of integration processing, the same labeling number as the labeling used in the integration processing may be assigned to pixels between these wall candidates (pixels corresponding to the gap portion GP). Thereby, the gap portion GP is also able to be labeled with the labeling number used in the integration processing. Therefore, the series of walls W1 without a break at the gap portion GP is able to be formed, and detection thereof as a wall is facilitated.

Figure 25A:
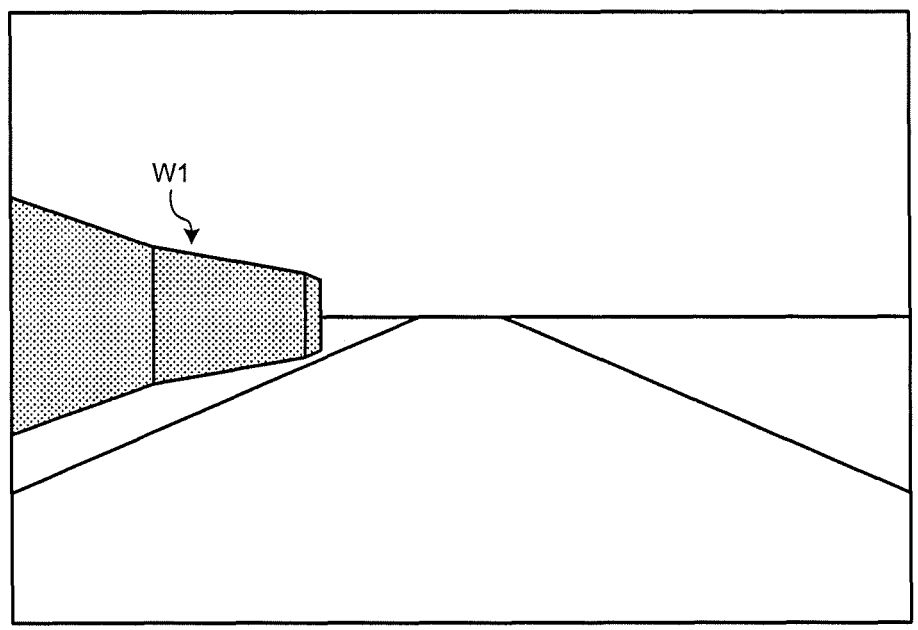
FIGS. 25A, 25B, and 25C are diagrams for explanation of wall sorting processing executed by a wall detecting unit 618 based on a small U-map serving as results of integration processing.
Figure 25B:
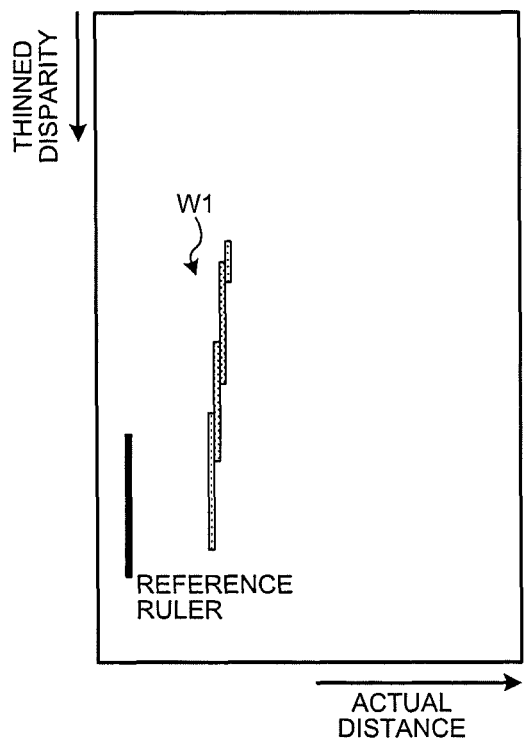
Figure 25C:
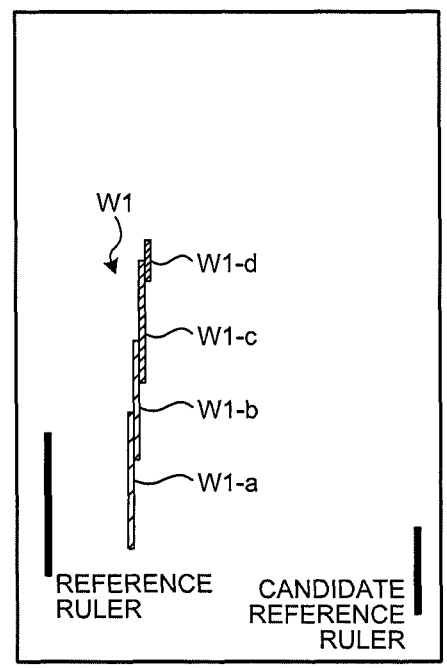

At Step S604 of the flow chart in FIG. 19, the wall detecting unit 618 executes sorting of walls, based on a small U-map serving as results of such integration processing. For example, as illustrated in FIG. 25A, in a case of a captured image for a wall W1 having a shape that is a little bent toward a road at a deep side of the wall W1, the shape of the wall W1 on the small U-map is a shape where the deep side of the wall W1 goes inward (toward the road) as illustrated in FIG. 25B. When labeling processing is executed thereon, labeling results are obtained, which have different labeling numbers assigned respectively to wall candidates W1-a to W1-d having different lengths as illustrated in FIG. 25C, and in which the wall candidates W1-a to W1-d neighbor one another and extend in the depth direction.

Figure 26A:
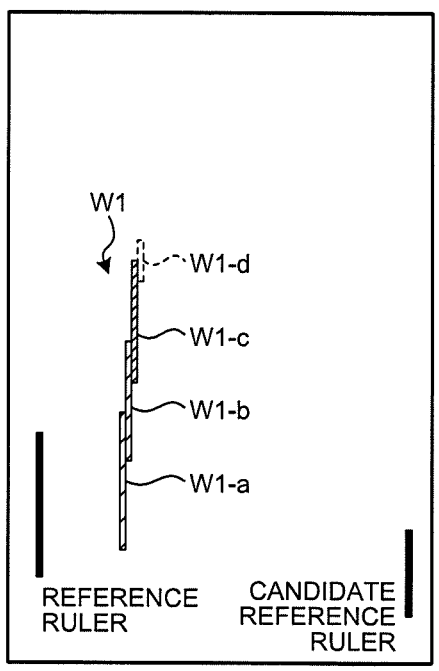
FIGS. 26A and 26B are diagrams illustrating how the wall detection candidates are detected as a series of walls.

When, by use of only one reference ruler having a length corresponding to the labeling number of the wall candidate W1-a, for example, the other wall candidates are detected from these labeling results; since the wall candidate W1-d corresponding to a portion that is a little bent toward the road at its deep side is shorter than the wall candidate W1-a serving as the reference ruler, the wall candidate W1-d is determined as an object other than the wall W1 as illustrated with a dotted line in FIG. 26A.

Figure 26B:
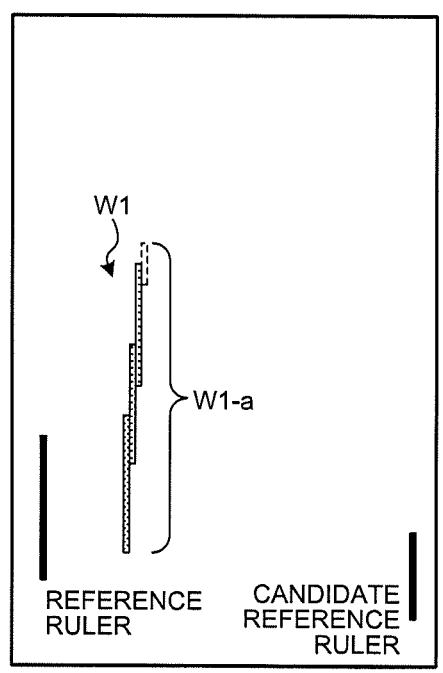

However, in the device control system according to the second embodiment, since the same labeling number is assigned to all of the wall candidates W1-a to W1-d by the above described integration processing, the wall candidates W1-a to W1-d are able to be detected as a series of walls W1 continuous in the depth direction, at Step S604 of the flow chart in FIG. 19, as illustrated in FIG. 26B.

Next, the device control system according to the second embodiment executes the above described wall detection by using a low resolution small U-map, and executes detection of other objects, such as, for example, humans and preceding vehicles, by using a high resolution real U-map generated together with the small U-map. Specifically, in the real U-map, an area inside the wall W1 detected in the small U-map is made a detection area for other objects, such as humans and preceding vehicles. Since the device control system according to the second embodiment is able to detect the wall W1 accurately as described above, the device control system is able to detect other objects by performing clear zoning into a wall area and a detection area for other objects.

For example, as illustrated in FIG. 27A, in a case of a captured image where a human H1 is walking inside a wall W1 having a shape that is a little bent toward a road at a deep side of the wall W1, a small U-map illustrated in FIG. 27B is obtained. When labeling processing for the wall W1 is executed by use of this small U-map and wall candidates are integrated together with the same labeling number, a series of walls W1 is able to be detected as illustrated in FIG. 27C.

The wall W1 illustrated in FIG. 27A has a shape that is a little bent toward the road at a deep side thereof. Therefore, if a rectangle circumscribing the wall W1 is determined as a detection area for other objects, even though the wall W1 is bent, the area of the wall W1 and the detection area for other objects are linearly divided as illustrated in FIG. 27D. Thereby, as illustrated in FIG. 27D, a problem where the human H1 is recognized as the wall W1 and is not detected may be caused.

In contrast, in the device control system according to the second embodiment, the wall detecting unit 618 executes detection inside the wall W1 per column that has been subjected to the labeling processing on the real U-map, and performs zoning into the area of the wall W1 and the detection area for other objects as illustrated in FIG. 27E. Thereby, as illustrated in FIG. 27E, along a line inside pixels of each wall candidates, the area of the wall W1 and the detection area for other objects are able to be zoned.

Therefore, as illustrated in FIG. 27E, the human H1 is able to be detected in the detection area for other objects indicated with oblique lines in FIG. 27E. Therefore, a problem where the human H1 is confused with the wall W1 and is not detected is able to be prevented. Further, with the device control system according to the second embodiment, the area of the wall W1 and the detection area for other objects are able to be zoned clearly. Detection of other objects is executed on the detection area for other objects. Therefore, the detection of other objects is limited to the detection area for other objects, and thus the amount of calculation needed for the detection of other objects is able to be reduced, and needless object detection processing is able to be reduced. Therefore, aimed objects are able to be detected speedily.

The above described embodiments have been presented as examples, and are not intended for limitation of the scope of the present invention. These novel embodiments may be implemented in various other modes, and various omissions, substitutions, and modifications may be made without departing from the gist of the invention. For example, since a value of distance (a distance value) and a disparity value are able to be treated equivalently, the above described embodiments are described by use of disparity images as examples of a distance image, but the embodiments are not limited thereto. For example, a distance image may be generated by integration of distance information generated by use of a detecting device, such as a millimeter-wave radar or a laser radar, with a disparity image generated by use of a stereo camera. Further, by use of a stereo camera in combination with a detecting device, such as a millimeter-wave radar or a laser radar, and combination with results of the above described object detection by the stereo camera, a configuration even higher in detection accuracy may be formed.

These embodiments and modifications of the embodiments are included in the scope and the gist of the invention, and are included in the invention stated in the claims and the scope equivalent thereto.

The embodiments have an effect of enabling a continuous three-dimensional object to be easily detected.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A processing device, comprising:
   generating circuitry configured to generate two-dimensional distribution information of an object, the two-dimensional distribution information associating between at least a lateral direction distance and a depth direction distance of the object;
   detecting circuitry configured to detect a continuous area having continuity in a depth direction in the two-dimensional distribution information;
   labeling circuitry that assigns a label to plural pieces of information continuous in the depth direction of the two-dimensional distribution information;
   sorting circuitry that sorts out information continuous in the depth direction over a predetermined threshold or more, from information assigned with a same label; and
   integrating circuitry that integrates labels of plural pieces of information having a lateral direction range or a depth direction range that is in a predetermined range, into the same label, the plural pieces of information being among the information sorted out, wherein if pieces of the information sorted out by the sorting circuitry and assigned with labels different from each other are in a predetermined range in the depth direction, the integrating circuitry performs integration by assigning the same label to a piece of the information that is between the pieces of the information assigned with the labels different from each other.

2. The processing device according to claim 1, wherein:
the detecting circuitry detects, as the continuous area, an area connected in the depth direction in the two-dimensional distribution information.

3. The processing device according to claim 1, wherein:
the generating circuitry generates low resolution two-dimensional distribution information for detection of a detection target, and high resolution two-dimensional distribution information for detection of an object different from the detection target, and
the detecting circuitry detects, based on the low resolution two-dimensional distribution information, the continuous area.

4. The processing device according to claim 1, wherein:
the generating circuitry generates the two-dimensional distribution information in an orthogonal coordinate system having coordinate axes corresponding to values respectively based on distance and disparity in a horizontal direction,
the detecting circuitry detects a continuous area having priority in a direction of an axis of the value based on the disparity of the two-dimensional distribution information.

5. The processing device according to claim 1, wherein:
the detecting circuitry detects, as the continuous area, an area where pixels are continuous in the direction of an axis of a value based on the disparity of the two-dimensional distribution information.

6. The processing device according to claim 5, wherein:
if plural sets of the pixels are apart by an interval equal to or less than a predefined allowable number of pixels in the direction of the axis of the value based on the disparity of the two-dimensional distribution information, the detecting circuitry regards the plural sets of the pixels to be continuous.

7. The processing device according to claim 5, further comprising:
determining circuitry configured to determine that the continuous area represents a detection target if the number of pixels continuous in the continuous area is equal to or greater than a predefined reference,
wherein the determining circuitry changes the reference according to a position along the direction of the axis of the value based on the disparity of the two-dimensional distribution information.

8. The processing device according to claim 1, further comprising:
object detecting circuitry configured to detect an object based on the two-dimensional distribution information; and
area determining circuitry that determines, based on the continuous area determined by the determining circuitry to be representing a detection target, an object detection target area to be subjected to detection of an object, the object detection target area being of the two-dimensional distribution information, wherein the object detecting circuitry detects an object in the object detection target area determined by the area determining circuitry.

9. The processing device according to claim 8, wherein:
the area determining circuitry determines, as the object detection target area, an area surrounded by the continuous area determined as the detection target by the determining circuitry.

10. The processing device according to claim 8, wherein:
when the detecting circuitry detects the continuous area, the generating circuitry generates the two-dimensional distribution information such that the two-dimensional distribution information has a resolution lower than that in a case where the object detecting circuitry detects the object.

11. An object recognition apparatus, comprising:
a stereo camera; and
the processing device according to claim 1,
wherein the generating circuitry generates the two-dimensional distribution information based on disparity calculated using a plurality of images captured by the stereo camera.

12. A device control system, comprising:
control circuitry that controls a device based on the continuous area determined as representing a detection target by the processing device according to claim 1.

13. A processing method, including:
generating two-dimensional distribution information of an object, the two-dimensional distribution information associating between at least a distance in a lateral direction and a distance in a depth direction, of the object;
detecting a continuous area having continuity in the depth direction in the two-dimensional distribution information;
determining whether or not the continuous area represents a detection target;
assigning a label to plural pieces of information continuous in the depth direction of the two-dimensional distribution information;
sorting out information continuous in the depth direction over a predetermined threshold or more, from information assigned with a same label; and
integrating labels of plural pieces of information having a lateral direction range or a depth direction range that is in a predetermined range, into the same label, the plural pieces of information being among the information sorted out,
wherein if pieces of the information sorted out by the sorting and assigned with labels different from each other are in a predetermined range in the depth direction, the integrating performs integration by assigning the same label to a piece of the information that is between the pieces of the information assigned with the labels different from each other.

14. A non-transitory computer-readable recording medium that contains a computer that causes a computer to execute:
generating two-dimensional distribution information of an object, the two-dimensional distribution information associating between at least a distance in a lateral direction and a distance in a depth direction, of the object;
detecting a continuous area having continuity in the depth direction in the two-dimensional distribution information;

determining whether or not the continuous area represents a detection target;

assigning a label to plural pieces of information continuous in the depth direction of the two-dimensional distribution information;

sorting out information continuous in the depth direction over a predetermined threshold or more, from information assigned with a same label; and integrating labels of plural pieces of information having a lateral direction range or a depth direction range that is in a predetermined range, into the same label, the plural pieces of information being among the information sorted out, wherein if pieces of the information sorted out by the sorting and assigned with labels different from each other are in a predetermined range in the depth direction, the integrating performs integration by assigning the same label to a piece of the information that is between the pieces of the information assigned with the labels different from each other.

15. A vehicle that includes device control system according to claim 12 and is controlled by the control circuitry.

16. The method according to claim 13, wherein:
the detecting detects, as the continuous area, an area connected in the depth direction in the two-dimensional distribution information.

17. The method according to claim 13, wherein:
the generating generates low resolution two-dimensional distribution information for detection of the detection target, and high resolution two-dimensional distribution information for detection of an object different from the detection target, and
the detecting detects, based on the low resolution two-dimensional distribution information, the continuous area.

18. The method according to claim 13, wherein:
the generating generates the two-dimensional distribution information in an orthogonal coordinate system having coordinate axes corresponding to values respectively based on distance and disparity in a horizontal direction,
the detecting detects a continuous area having priority in a direction of an axis of the value based on the disparity of the two-dimensional distribution information.

19. The non-transitory computer-readable recording medium according to claim 14, wherein:
the detecting detects, as the continuous area, an area connected in the depth direction in the two-dimensional distribution information.

20. The non-transitory computer-readable recording medium according to claim 14, wherein:
the generating generates low resolution two-dimensional distribution information for detection of the detection target, and high resolution two-dimensional distribution information for detection of an object different from the detection target, and
the detecting detects, based on the low resolution two-dimensional distribution information, the continuous area.

* * * * *